US011019328B2

(12) United States Patent
Han et al.

(10) Patent No.: US 11,019,328 B2
(45) Date of Patent: May 25, 2021

(54) NANOSTRUCTURED OPTICAL ELEMENT, DEPTH SENSOR, AND ELECTRONIC DEVICE

(71) Applicant: SAMSUNG ELECTRONICS CO., LTD., Suwon-si (KR)

(72) Inventors: Seunghoon Han, Seoul (KR); Byunghoon Na, Suwon-si (KR); Jangwoo You, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 215 days.

(21) Appl. No.: 16/166,580

(22) Filed: Oct. 22, 2018

(65) Prior Publication Data
US 2019/0058871 A1    Feb. 21, 2019

Related U.S. Application Data

(63) Continuation-in-part of application No. 15/984,831, filed on May 21, 2018.

(30) Foreign Application Priority Data

Aug. 14, 2017   (KR) .................. 10-2017-0103214

(51) Int. Cl.
*H04N 13/271* (2018.01)
*G01B 11/25* (2006.01)
*B82Y 20/00* (2011.01)

(52) U.S. Cl.
CPC ........... *H04N 13/271* (2018.05); *G01B 11/25* (2013.01); *G01B 11/2513* (2013.01); *B82Y 20/00* (2013.01)

(58) Field of Classification Search
CPC ..... B82Y 20/00; G01B 11/2513; G01B 11/25; H04N 13/271
USPC .................................................. 359/237, 298
See application file for complete search history.

(56) References Cited

U.S. PATENT DOCUMENTS

| 5,138,495 | A  | * | 8/1992  | Shiono .................... G02B 3/08 250/201.6 |
| 8,947,509 | B2 |   | 2/2015  | Bloom et al. |
| 9,239,467 | B2 |   | 1/2016  | Shpunt et al. |
| 9,354,041 | B2 |   | 5/2016  | Yamagata |
| 2012/0281206 | A1 | * | 11/2012 | Ko ........................ G01S 7/4816 356/218 |
| 2016/0197452 | A1 |   | 7/2016  | Mor |

\* cited by examiner

*Primary Examiner* — Tuyen Tra
(74) *Attorney, Agent, or Firm* — Sughrue Mion, PLLC

(57) ABSTRACT

Provided are a nanostructured optical element, a depth sensor, and an electronic device. The nanostructured optical element includes: an array of a plurality of laser sources; a meta-pattern layer including a two-dimensional array of plurality of first nano-posts; and a deflecting layer between the light source and the meta-pattern layer. Each of the first nano-posts has a dimension smaller than a wavelength of light output from the plurality of laser sources. The deflecting layer is configured to direct light from the light source onto the meta-pattern layer.

19 Claims, 21 Drawing Sheets

NANOSTRUCTURED OPTICAL ELEMENT, DEPTH SENSOR, AND ELECTRONIC DEVICE

CROSS-REFERENCE TO RELATED APPLICATION

This is a Continuation-In-Part Application of U.S. application Ser. No. 15/984,831 filed on May 21, 2018, which claims priority from Korean Patent Application No. 10-2017-0103214, filed on Aug. 14, 2017, in the Korean Intellectual Property Office, the disclosures of which are incorporated herein in their entirety by reference.

BACKGROUND

1. Field

Example embodiments relate to nanostructured optical elements, depth sensors, and/or electronic devices.

2. Description of the Related Art

Recently, demand for smartphones has been increasing rapidly. Thus, an image sensor included in a smartphone has been actively developed. An image sensor typically includes a plurality of pixels converting photons of a predetermined spectrum band into electrons. A three-dimensional (3D) image may be obtained based on information about color and depth defined as a distance between an object and the image sensor. Typical methods of obtaining such depth information may include a time of flight (TOF) method and a structured light method. The TOF method may be described as a method of detecting a phase shift and a method of using a light pulse. The structured light method may obtain depth information by irradiating structured light onto the object and monitoring the structured light as distorted by the object.

SUMMARY

Example embodiments relate to nanostructured optical elements, depth sensors, and/or electronic devices.

Example embodiments will be set forth in part in the description which follows and, in part, will be apparent from the description, or may be learned by practice of the described embodiments.

According to an aspect of an example embodiment, a nanostructured optical element may include a light source in which a plurality of laser sources irradiating light are configured in an array, a meta-pattern layer including a plurality of first nano-posts arranged in a two-dimensional array, wherein each of the plurality of first nano-posts has a sub-wavelength dimension, wherein the plurality of first nano-posts are configured to change the light from the light source into structured light, and a deflecting layer between the light source and the meta-pattern layer, the deflecting layer being configured to change a proceeding direction of the light to make the light from the light source incident onto the meta-pattern layer.

The laser source may be one of a VCSEL laser, a Fabry-Perot type laser diode, a distributed feedback (DFB) type laser diode.

The deflecting layer may include a convex lens or a Fresnel lens.

The deflecting layer may include a plurality of second nano-posts that are arranged in a two-dimensional array and each of which has a sub-wavelength dimension.

The nanostructured optical element may further include a supporting layer between the meta-pattern layer and the deflecting layer.

The meta-pattern layer may be provided on a first surface of the supporting layer, and the deflecting layer may be provided on a second surface of the supporting layer.

The meta-pattern layer may further include a supporting layer supporting the plurality of first nano-posts, and the meta-pattern layer may have a refractive index that is greater than a refractive index of the supporting layer by one (1) or more.

The plurality of first nano-posts may be arranged in a hexagonal lattice or a rectangular lattice.

The plurality of first nano-posts may have asymmetric forms.

At least some of the plurality of first nano-posts may have different shapes from each other.

At least some of the plurality of first nano-posts may have different widths or different heights from each other.

The plurality of first nano-posts may have multi-layered structures.

The plurality of first nano-posts may include a metal material.

The plurality of first nano-posts may be configured so that the structured light that is transmitted through the meta-pattern layer does not overlap with other structured light in a spatial frequency domain.

The plurality of first nano-posts may be configured so that the structured light that is transmitted through the meta-pattern layer overlaps with other structured light in the spatial frequency domain.

The meta-pattern layer may convert the light from the light source into structured light having a one-dimensional periodic pattern or structured light having a two-dimensional periodic pattern.

The meta-pattern layer may convert the light from the light source into structured light having random pattern.

The nanostructured optical element may further include an addressing unit configured to independently address each of the plurality of laser sources configured as an array.

According to an aspect of another example embodiment, a depth sensor may include a nanostructured optical element configured to irradiate structured light onto an object, a light-receiving sensor configured to receive the structured light reflected from the object, and a controller configured to obtain distance information by analyzing the structured light received by the light receiving sensor.

According to an aspect of another example embodiment, an electronic device includes the nanostructured optical element according to the above description.

According to an aspect of another example embodiment, a depth recognition apparatus may include: any one of the above-described projectors configured to emit structured light onto an object; a first sensor and a second sensor that are configured to receive light coming from the object and are arranged at different positions relative to the projector; and a processor configured to analyze the light received by at least one of the first and second sensors and to calculate a depth position of the object.

The processor may be configured to: obtain first image data from the light received at the first sensor; obtain second image data from the light received at the second sensor; and calculate the depth position of the object from the first image data and the second image data.

The processor may be configured to: obtain first depth information about the object by analyzing the structured light emitted from the projector to the object and the light received at the first sensor; obtain second depth information about the object by analyzing the structured light emitted from the projector to the object and the light received at the second sensor; and calculate the depth position of the object from the first depth information and the second depth information.

The depth recognition apparatus may further include an illuminance sensor configured to sense illuminance of a surrounding area, wherein when a signal sensed by the illuminance sensor is equal to or greater than a given value, the processor may turn off the projector.

When the projector is in an off-state, the processor may be configured to: obtain first image data about the object from a signal that the first sensor outputs when receiving ambient light reflected from the object; obtain second image data about the object from a signal that the second sensor outputs when receiving ambient light reflected from the object; and calculate the depth position of the object from the first image data and the second image data.

The processor may be configured to: turn on the projector and obtain primary-first image data and secondary-first image data from light received at the first and second sensors, respectively; and turn off the projector and obtain primary-second image data and secondary-second image data from light received at the first and second sensors, respectively.

The processor may be configured to: calculate first depth information about the object from the primary-first image data and the secondary-first image data; calculate second depth information about the object from primary-second image data and the secondary-second image data; and calculate the depth position of the object from the first depth information and the second depth information.

The processor may be configured to: calculate first difference image data from a difference between the primary-first image data and the primary-second image data; calculate second difference image data from a difference between the secondary-first image data and the secondary-second image data; and calculate the depth information about the object from the first image data and the second image data.

At least one of the first and second sensors may include: a switchable filter configured to be switched between an infrared-cut mode and an infrared transmission mode; and an image sensor configured to sense light incident thereon after passing through the switchable filter.

The processor may be configured to control the switchable filter such that the switchable filter may block infrared rays in a normal photographic mode and may transmit infrared rays in a depth recognition mode.

BRIEF DESCRIPTION OF THE DRAWINGS

These and/or other example aspects and advantages of example embodiments will become apparent and more readily appreciated from the following description, taken in conjunction with the accompanying drawings in which.

DETAILED DESCRIPTION

Figure 1A:
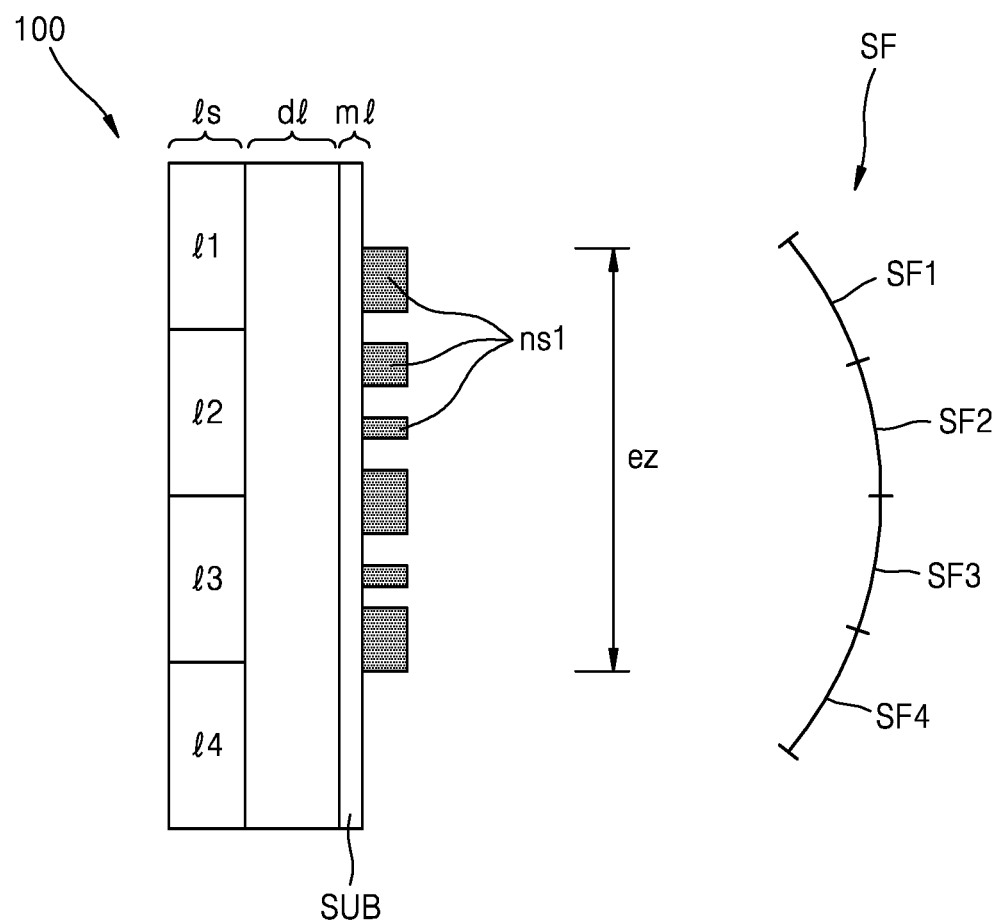
FIGS. 1A and 1B are schematic diagrams of a nanostructured optical element, according to an example embodiment.

Hereinafter, example embodiments of a nanostructured optical element, a depth sensor, and an electronic device will be described in detail with reference to accompanying drawings. Thickness and size of each component in the drawings may be exaggerated, omitted or schematically illustrated for the sake of clear and easy illustration. Throughout the specification, like reference numerals denote the like elements.

All terms including descriptive or technical terms which are used herein should be construed as having meanings that are obvious to one of ordinary skill in the art. However, the terms may have different meanings according to an intention of one of ordinary skill in the art, precedent cases, or the appearance of new technologies. Also, some terms may be arbitrarily selected by the applicant. In this case, the meaning of the selected terms will be described in the detailed description. Thus, the terms used herein have to be defined based on the meaning of the terms together with the description throughout the specification.

It will be understood that although the terms "first" and "second" are used herein to describe various elements, these elements should not be limited by these terms. Terms are only used to distinguish one element from other elements.

An expression used in the singular encompasses the expression of the plural, unless it has a clearly different meaning in the context. Throughout the specification, when a portion "includes" an element, another element may be further included, rather than excluding the existence of the other element, unless otherwise described.

Figure 1B:
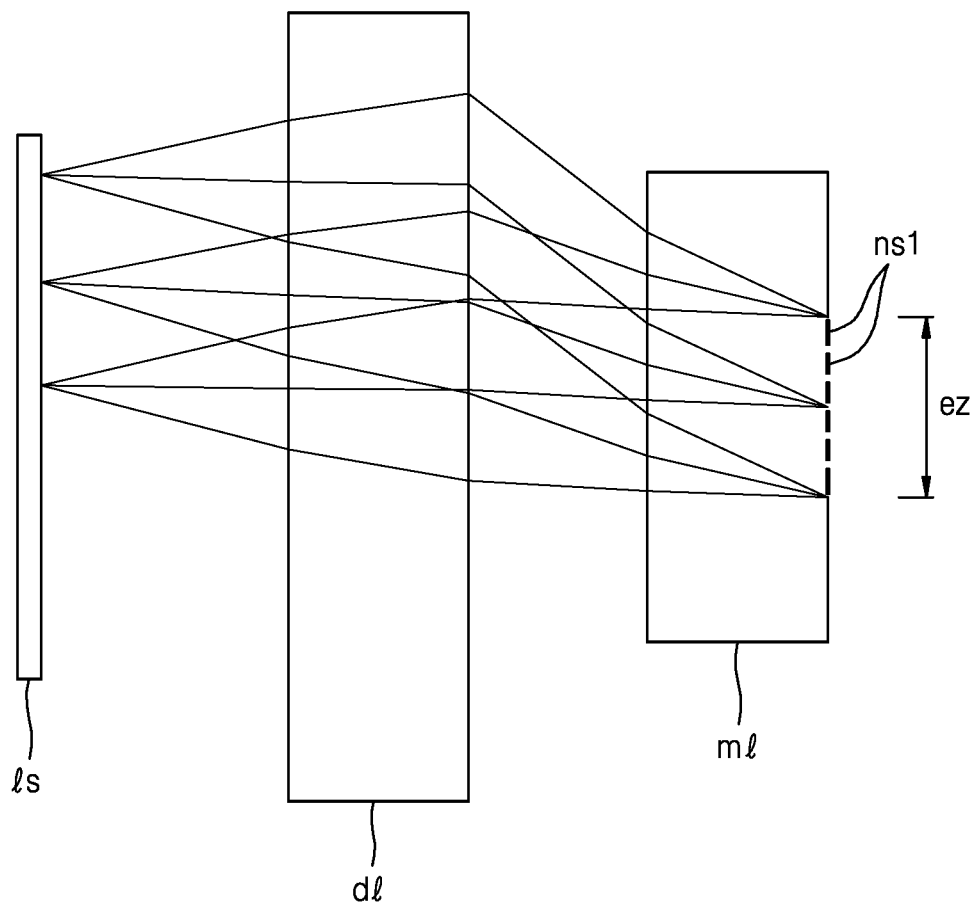

FIGS. 1A and 1B are schematic diagrams of a nanostructured optical element 100, according to an example embodiment. Referring to FIGS. 1A and 1B, the nanostructured optical element 100 includes a light source ls, a deflecting layer dl, and a meta-pattern layer ml. According to the nanostructured optical element 100 of the example embodiment, light output from the light source ls is converted into structured light in the meta-pattern layer ml and may be output to a spatial frequency domain SF.

The light source ls may include a plurality of laser sources l1, l2, l3, and l4 that are each configured as an array to irradiate light. For example, the plurality of laser sources l1, l2, l3, and l4 may be configured as a one-dimensional or two-dimensional (2D) array. The light source ls may include, for example, one of a VCSEL laser, a Fabry-Perot type laser diode, and a distributed feedback (DFB) type laser diode.

In some example embodiments, the meta-pattern layer ml modulates the light irradiated from the light source ls to generate the structured light and outputs the structured light to the spatial frequency domain SF. When the light from the light source ls is incident onto the meta-pattern layer ml, the meta-pattern layer ml generates a distribution of rays of light which are output. The rays of light generate patterns including beam spots in a predetermined spatial frequency domain SF. Such patterns may have various distributions defined by detailed conditions applied to the meta-pattern layer ml. The light having the patterns is referred to herein as structured light.

The structured light generated by the meta-pattern layer ml may be mathematically coded so that bright and dark spots may designate coordinates of locations in each direction. Such patterns may be transformed when irradiated onto a three-dimensional (3D) object, and the transformation may be imaged by an imaging device such as, for example, a camera, in order to compare the patterns and to trace the degree of transformation of each coordinate of the pattern to extract depth information of the 3D object.

In some example embodiments, the spatial frequency domain SF may be partitioned into first to fourth sub spatial frequency domains SF1, SF2, SF3, and SF4 according to location. For example, the sub spatial frequency domains SF1, SF2, SF3, and SF4 may respectively correspond to laser sources l1, l2, l3, and l4. For example, light irradiated from the first laser source l1 may be transmitted through the meta-pattern layer ml and form the structured light incident on a first sub spatial frequency domain SF1. Likewise, the second laser source l2 may correspond to a second sub spatial frequency domain SF2, the third laser source l3 may correspond to a third sub spatial frequency domain SF3, and the fourth laser source l4 may correspond to a fourth sub spatial frequency domain SF4. The light that is transmitted through the meta-pattern layer ml may form structured light having an identical form in each of the sub spatial frequency domains SF1, SF2, SF3, and SF4, regardless of the laser source l1, l2, l3, or l4 irradiating the light.

The meta-pattern layer ml may include a plurality of nano-posts ns1 that are two-dimensionally arranged and distributed to change the light irradiated from light source into the structured light. The plurality of first nano-posts ns1 may be configured to satisfy a sub-wavelength condition. The sub-wavelength condition denotes a condition, in which dimensions defining shapes of the nano-posts (e.g., width, height, and pitch) are smaller than an operating wavelength of the meta-pattern layer ml. For example, a dimensional magnitude of the plurality of first nano-posts ns1 may be half the operating wavelength of the meta-pattern layer ml or less, and the meta-pattern layer ml may operate in a high scattering unit to improve an efficiency of optical modulation. However, the dimensional magnitudes of the plurality of first nano-posts ns1 are not limited to half the operating wavelength of the meta-pattern layer ml or less.

The plurality of first nano-posts ns1 may each have a transmission intensity and a transmission phase having distinctive values according to a material and a shape thereof. A shape distribution of the plurality of first nano-posts ns1 may be controlled in order to control a distribution of phase or intensity of the light transmitted through the meta-pattern layer ml. For example, a size of the nano-post ns1 in a horizontal or vertical direction or a material of the first nano-post ns1 may be controlled according to the location of the first nano-post ns1, in order to obtain a desired transmission intensity distribution or transmission phase distribution. In order to form the desired transmission intensity distribution or the transmission phase distribution, a shape distribution of the first nano-posts ns1 according to the locations thereof may be defined in a predetermined group including the plurality of first nano-posts ns1. Also, the group of the first nano-posts ns1 may be repeatedly arranged according to a predetermined period. The shape distribution of the plurality of first nano-posts ns1 may be regular, periodical, or quasi-periodical, but is not limited thereto, that is, the shape distribution of the plurality of first nano-posts ns1 may be random. An effective zone ez, within which the plurality of first nano-posts ns1 are configured to form the structured light, may be defined on the meta-pattern layer ml.

Figure 2A:
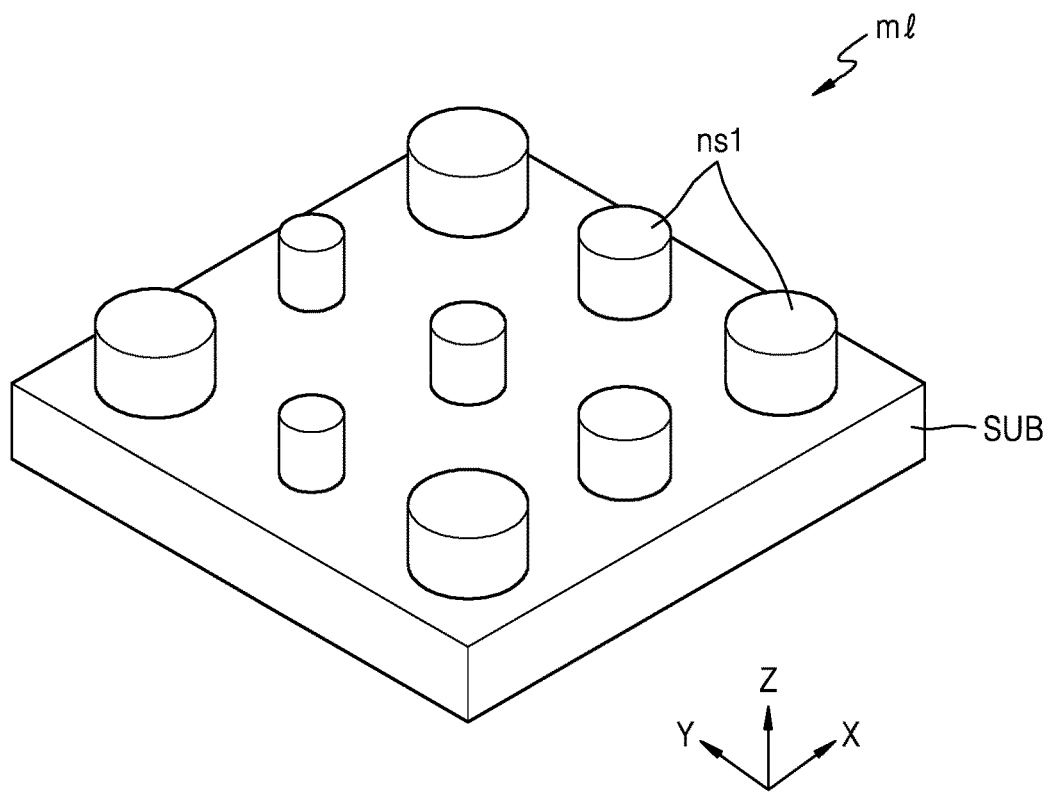
FIGS. 2A and 2B are schematic diagrams of a meta surface layer, according to an example embodiment.
Figure 2B:
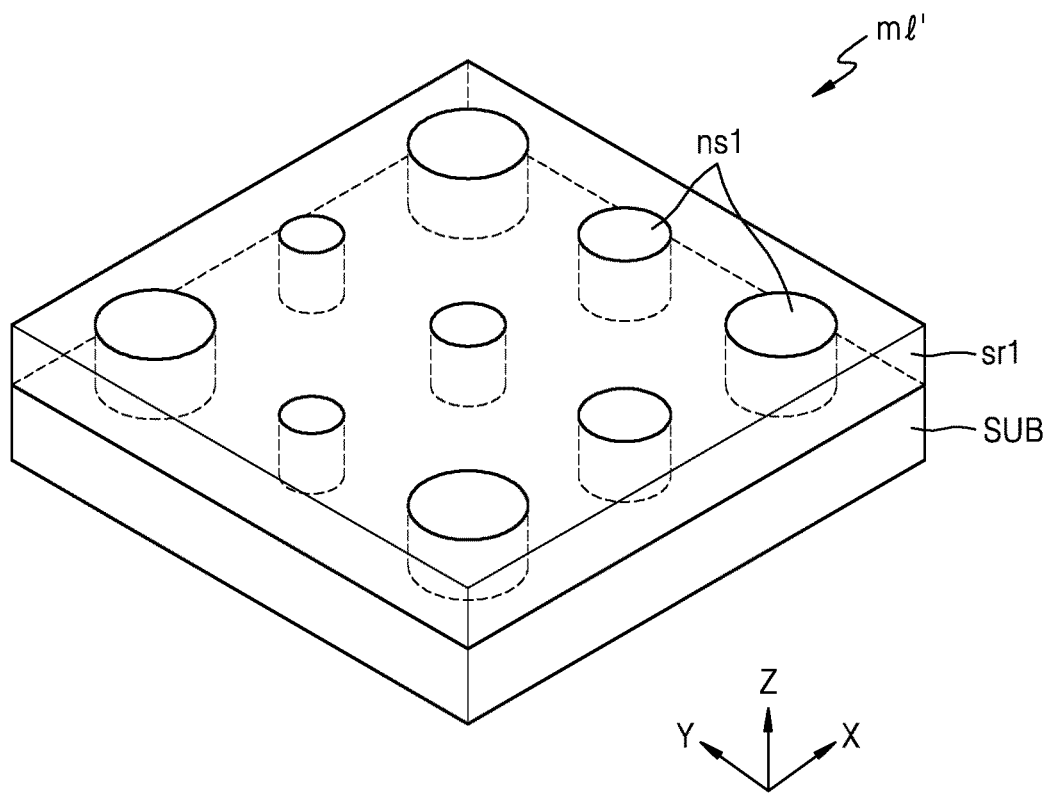

The meta-pattern layer ml may include, as illustrated in FIGS. 2A and 2B, a supporting layer SUB supporting the first nano-posts ns1. For example, the supporting layer SUB may include SiO2, a transparent conductive oxide (TCO), or a polymer such as polycarbonate (PC), polystyrene (PS), or polymethyl methacrylate (PMMA). The material included in the support layer SUB is not limited to the above examples, and, for example, the supporting layer SUB may include a semiconductor material. For example, the supporting layer SUB and the plurality of first nano-posts ns1 may both include an identical semiconductor material, e.g., a group III-V semiconductor compound. Also, a composition ratio of the compound may be controlled such that a refractive index of the supporting layer SUB is less than the refractive index of the plurality of first nano-posts ns1. For example, a difference between the refractive index of the supporting layer SUB and the refractive index of the plurality of first nano-posts ns1 may be about 1.0 or greater. The first nano-posts ns1 may be surrounded by a first peripheral material including air, as described below with reference to FIG. 2B.

The plurality of first nano-posts ns1 may have, for example, a refractive index greater than the refractive index of the supporting layer SUB. For example, the plurality of first nano-posts ns1 may include a material including one of single crystalline silicon, polycrystalline silicon (poly Si), amorphous silicon (Si), Si3N4, GaP, TiO2, AlSb, AlAs, AlGaAs, AlGaInP, BP, and ZnGeP2.

The plurality of first nano-posts ns1 may include a metal material. Here, the plurality of first nano-posts ns1 may modulate optical characteristics by using a surface plasmon effect. For example, the plurality of first nano-posts ns1 may include a metal such as silver (Ag), gold (Au), copper (Cu), aluminum (Al), etc., but are not limited thereto.

In some example embodiments, the deflecting layer dl is between the light source ls and the meta-pattern layer ml. The deflecting layer dl may change a direction of the light according to the location of the light irradiated from each of, or at least one of, the laser sources l1, l2, l3, and l4 of the light source ls, so that the light may be incident to the meta-pattern layer ml. For example, the deflecting layer dl may change the direction of the light, so that the light irradiated from the laser sources l1, l2, l3, and l4 of the light source ls may be incident onto the effective zone ez of the meta-pattern layer ml. The light irradiated from the first laser source l1, light irradiated from the second laser source l2, light irradiated from the third laser source l3, and light irradiated from the fourth laser source l4 have different irradiation locations and emission angles from one another, and the deflecting layer dl may change the optical paths of the light so that the light irradiated from the first laser source l1, the second laser source l2, the third laser source l3, and the fourth laser source l4 proceeds towards the effective zone ez of the meta-pattern layer ml. Based on the use of the deflecting layer dl, structured light of an identical pattern may be generated regardless of the irradiation location of the laser sources l1, l2, l3, and l4. For example, the deflecting layer dl may include an optical device such as a convex lens and a Fresnel lens. For example, the deflecting layer dl may be a meta surface configured to change a phase and/or an angle of light transmitted therethrough, according to a location, based on the intention of a user. For example, the deflecting layer dl may include a plurality of second nano-posts ns2 that satisfy the sub-wavelength condition and are two-dimensionally arranged. An example embodiment will be described in detail with reference to FIG. 3.

FIGS. 2A and 2B are schematic diagrams of a meta-surface layer according, to an example embodiment. Referring to FIGS. 2A and 2B, a meta-pattern layer ml1 may include a plurality of first nano-posts ns1 having different shapes from one another.

As described above, the meta-pattern layer ml1 according to this example embodiment has a function of changing the light irradiated from the light source (not shown) into structured light. To do this, the meta-pattern layer ml1 may include the plurality of first nano-posts ns1, each of which has a function of phase modulation according to the location thereof. When the light is transmitted through the plurality of first nano-posts ns1, the intensity and phase of the light may be changed. The intensity and phase of the light transmitted through the plurality of first nano-posts ns1 may be contemporaneously or simultaneously changed. Therefore, based on the far-field diffraction principle of Fourier optics, a desired transmission characteristic of each location in the meta-pattern layer ml1 is determined, and then, detailed arrangement of the plurality of first nano-posts ns1 may be obtained.

Referring to FIG. 2A, the two-dimensional configuration of the plurality of first nano-posts ns1 may vary depending on the shape of the structured light that a user desires to obtain. For example, at least some of the plurality of first nano-posts ns1 may have different thicknesses or different heights from each other. For example, since at least some of the plurality of first nano-posts ns1 have different widths from each other, spatial phase modulations corresponding thereto may be different from each other. At least some of the plurality of first nano-posts ns1 may have different heights from each other, and thus, spatial phase modulations corresponding thereto may be different from each other. At least some of the plurality of first nano-posts ns1 may have different shapes from each other, and thus, spatial phase modulations corresponding thereto may be different from each other.

In some example embodiments, the plurality of first nano-posts ns1 may have a multi-layered structure. For example, the plurality of first nano-posts ns1 may include a plurality of layers including different materials from one another. For example, each of, or at least one of, the plurality of first nano-posts ns1 may include a first layer and a second layer disposed on the first layer, the first layer including a first material and the second layer including a second material, different from the first material. In this case, any of various transmission characteristics may be exhibited according to kinds of materials or thicknesses of each layer. For example, the plurality of first nano-posts ns1 may each include a first layer and a third layer including a metal material, and a second layer including a material having a high refractive index between the first layer and the third layer.

Referring to FIG. 2B, the meta-pattern layer ml' may include a first peripheral material sr1 surrounding the plurality of first nano-posts ns1. The first peripheral material sr1 may have a refractive index that is lower than the refractive index of the plurality of first nano-posts ns1. For example, the first peripheral material sr1 may include SiO2, TCO, or a polymer such as PC, PS, and PMMA. Alternately, the first peripheral material sr1 may include gas such as, for example, air, or another gas. For example, a difference between the refractive index of the first peripheral material sr1 and the refractive index of the plurality of first nano-posts ns1 may be about 1.0 or greater. The first peripheral material sr1 and the supporting layer SUB may include an identical material, but are not limited thereto.

Figure 3:
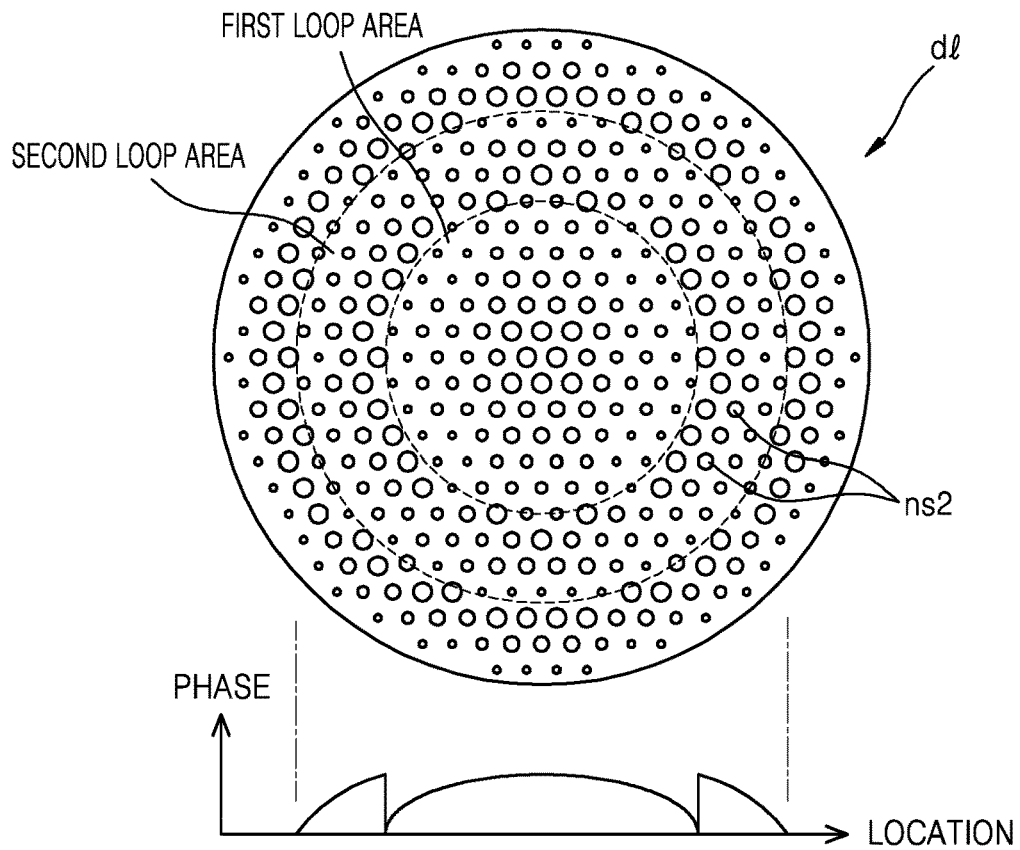
FIG. 3 is a schematic diagram of a planar structure and phase distribution of a deflecting layer, according to an example embodiment.

FIG. 3 schematically shows a planar structure of the deflecting layer dl and a phase distribution, according to an example embodiment. Referring to FIG. 3, the deflecting layer dl may be a metal surface including a plurality of second nano-posts.

In some example embodiments, the deflecting layer dl is between the light source (ls of FIG. 1) and the meta-pattern layer (ml of FIG. 1), as described above, in order to change the proceeding direction of light from the light source and make the light be incident onto the meta-pattern layer. The deflecting layer dl may include a convex lens or a Fresnel lens. The deflecting layer dl, according to an example embodiment, is manufactured by semiconductor processes to include the plurality of second nano-posts ns2 that are two-dimensionally arranged, and thus, is easy to be miniaturized and thus decreases manufacturing costs.

In order for the deflecting layer dl to function as a focusing optics, the plurality of second nano-posts ns2 may be arranged symmetrically with respect to a center point. For example, referring to FIG. 3, the deflecting layer dl may include a plurality of loop areas in order to function as a Fresnel lens. Each of, or at least one of the loop areas may be an area, in which diameters of cross-sections of the nano-posts gradually decrease away from a predetermined point. For example, the deflecting layer dl may include the plurality of loop areas including a first loop area and a second loop area, outward from the center thereof. However, the deflecting layer dl is not limited to the above example, and may alternately include the second nano-posts ns2 in any of various arrangements.

The plurality of second nano-posts ns2 may include a material including one of single crystalline silicon, polycrystalline silicon (poly Si), amorphous silicon (Si), Si3N4, GaP, TiO2, AlSb, AlAs, AlGaAs, AlGaInP, BP, and ZnGeP2. Alternately, the plurality of second nano-posts ns2 may include a metal material.

The deflecting layer dl may include a supporting layer (not shown) supporting the second nano-posts ns2. Since the supporting layer SUB is described above with reference to FIG. 1A, additional descriptions thereof are omitted here. The plurality of second nano-posts ns2 may have a refractive index that is higher than the refractive index of the supporting layer (not shown). The deflecting layer dl may include a second peripheral material layer (not shown) surrounding the second nano-posts ns2, and additional descriptions thereof are omitted since the descriptions are already provided above with reference to FIG. 2B.

Figure 4:
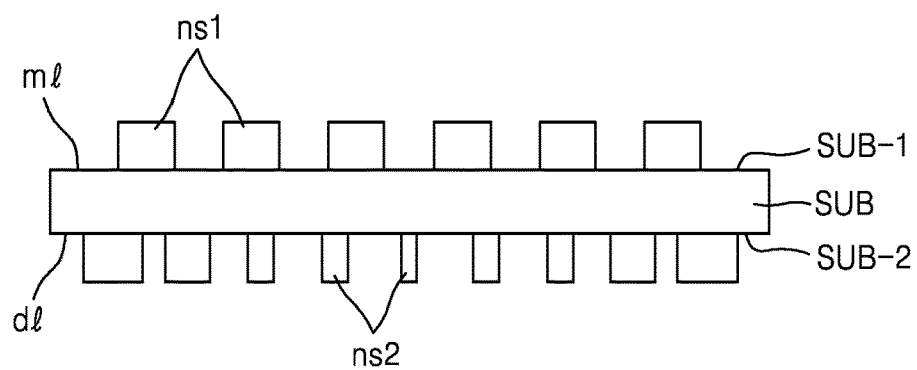
FIG. 4 is a schematic diagram of a deflecting layer and a meta surface layer provided on opposite surfaces of a supporting layer, according to an example embodiment.
Figure 5A:
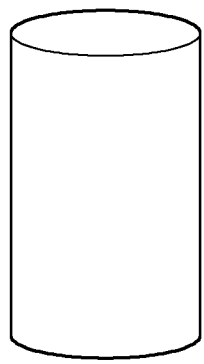
FIGS. 5A to 5D are perspective views of nano-posts according to one or more example embodiments.
Figure 5B:
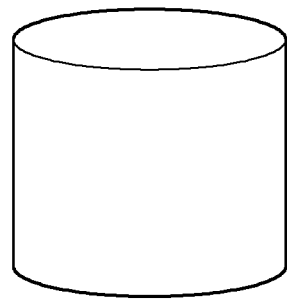
Figure 5C:
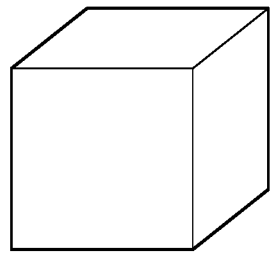
Figure 5D:
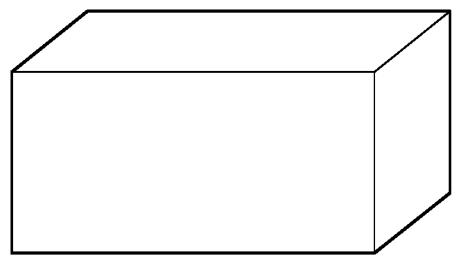

FIG. 4 is a schematic diagram of structures of the deflecting layer dl and the meta-pattern layer ml respectively provided on opposite surfaces of the supporting layer SUB, according to an example embodiment. Referring to FIG. 4, the meta-pattern layer ml is on a first surface SUB-1 of the supporting layer SUB, and the deflecting layer dl is on a second surface SUB-2 of the supporting layer SUB.

FIGS. 5A to 5D are perspective views showing shapes of a nano-post, according to one or more example embodiments. Referring to FIGS. 5A to 5D, the nano-post may have any of various shapes. The nano-posts may each have a pillar structure. For example, the nano-posts may each have a cross-section having one of a circular shape, an oval shape, a rectangular shape, and a square shape. When a nano-post has an asymmetric cross-section, the nano-post may be able to control light polarization.

For example, when the meta-pattern layer includes a configuration of nano-posts having asymmetric cross-sections, the meta-pattern layer may control the light transmitted therethrough to have varying phase and intensity transmission characteristics according to a polarization state of the light.

Figure 6:
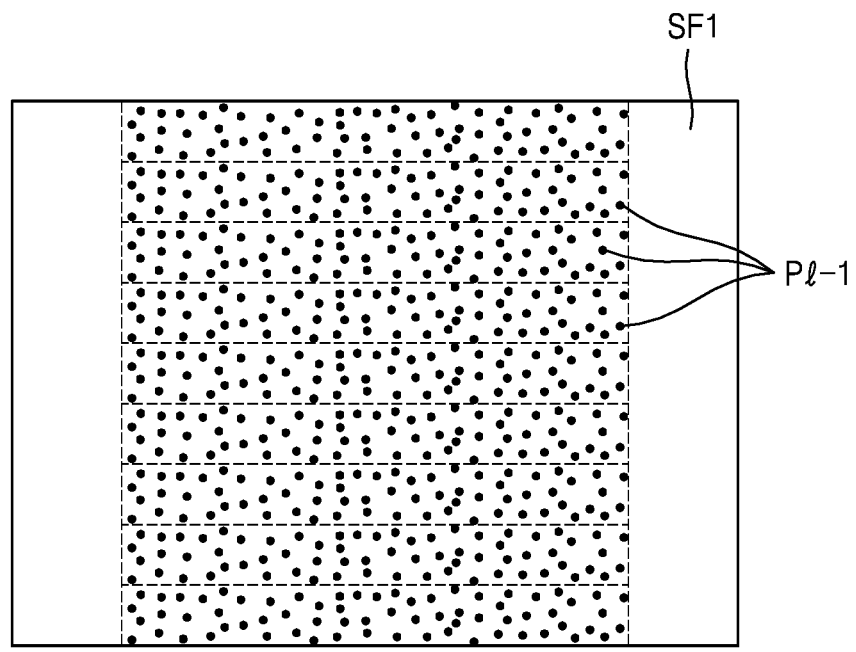
FIG. 6 is a diagram of structured light according to an example embodiment.

FIG. 6 is a diagram of a pattern PI-1 of structured light, according to an example embodiment. Referring to FIG. 6, the structured light may have a pattern that is periodic in one direction. The meta-pattern layer, according to this example embodiment may change the light from the light source so that the transmitted structured light may have a one-dimensional periodic pattern. A gap between the patterns provided periodically may be exaggerated, and alternatively, the periodic patterns may be successively configured without gaps therebetween.

Figure 7:
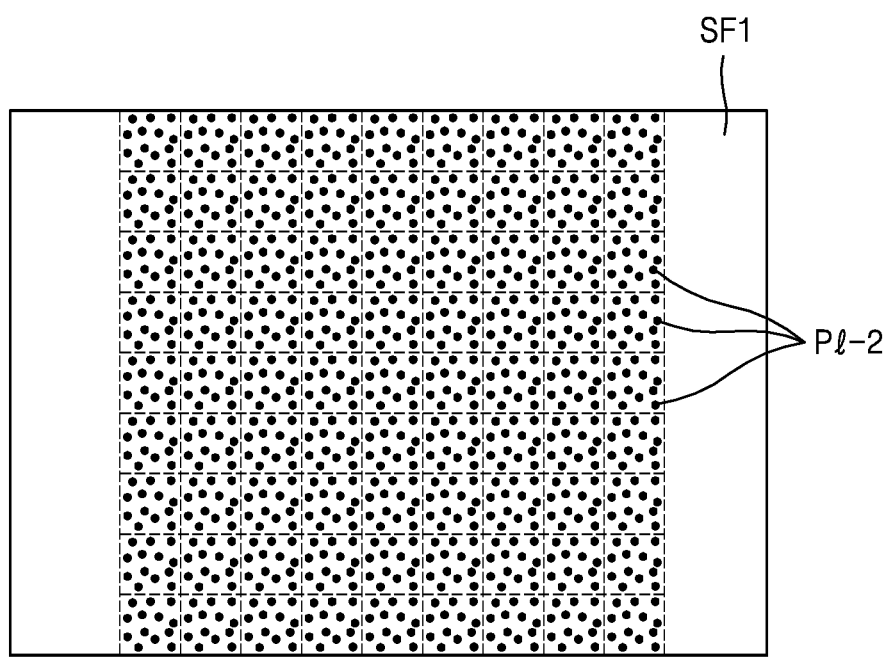
FIG. 7 is a diagram of structured light according to an example embodiment.

FIG. 7 is a diagram showing structured light PI-2, according to another example embodiment. Referring to FIG. 7, the structured light may have a pattern that is periodic in two dimensions. The meta-pattern layer according to this example embodiment may change the light from the light source so that the transmitted structured light may have a two-dimensional periodic pattern. A gap between the patterns provided periodically may be exaggerated, and alternatively, the periodic patterns may be successively configured without gaps therebetween.

Figure 8:
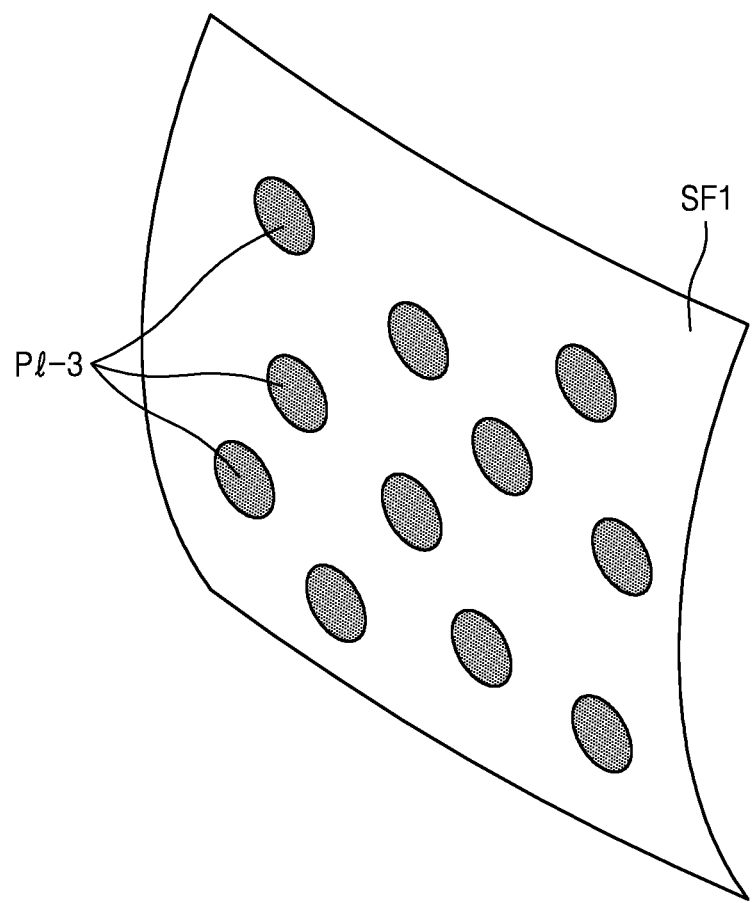
FIG. 8 is a diagram of structured light according to an example embodiment.

FIG. 8 is a diagram of structured light, according to another example embodiment. Referring to FIG. 8, the structured light may have a random pattern. The meta-pattern layer according to this example embodiment may change the light from the light source so that the transmitted structured light may have a random pattern.

Figure 9:
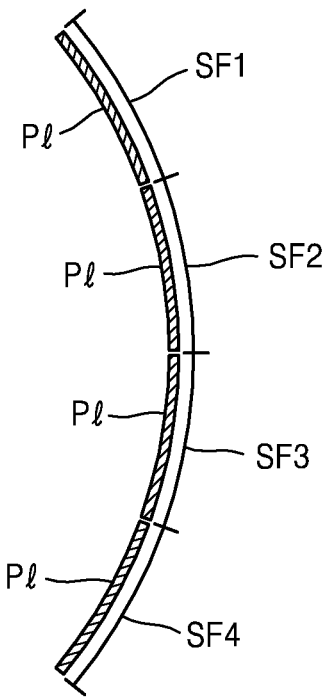
FIG. 9 is a schematic diagram of a nanostructured optical element and structured light according to an example embodiment.

FIG. 9 is a schematic diagram of the structured light formed on the spatial frequency domain SF, according to an example embodiment. Referring to FIG. 9, the nanostructured optical element according to the example embodiment illustrated in FIGS. 1 to 8 may form structured light PI on the spatial frequency domain SF so as not to be overlapping. That is, the structured light PI formed on each sub-spatial frequency domain SF-1, SF-2, SF-3, and SF-4 may be configured so as to not overlap with the structured light PI formed on any adjacent sub-spatial frequency domain. The meta-pattern layer may have the arrangement of the nano-posts for forming the above structured light PI.

Figure 10:
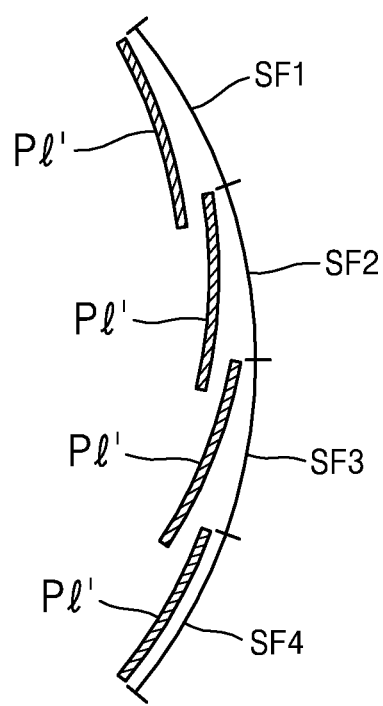
FIG. 10 is a schematic diagram of a nanostructured optical element and structured light according to an example embodiment.

FIG. 10 is a schematic diagram of structured light formed on a spatial frequency domain SF', according to another example embodiment. Referring to FIG. 10, the nanostructured optical element according to the example embodiment illustrated with reference to FIGS. 1 to 8 may form structured light PI' so as to be overlapping in the spatial frequency domain SF'. That is, the structured light PI' formed on each sub-spatial frequency domain SF'-1, SF'-2, SF'-3, and SF'-4 may be configured so as to overlap with the structured light PI formed on adjacent ones of the sub-spatial frequency domains. The meta-pattern layer may have the arrangement of the nano-posts for forming the above structured light PI'.

Figure 11:
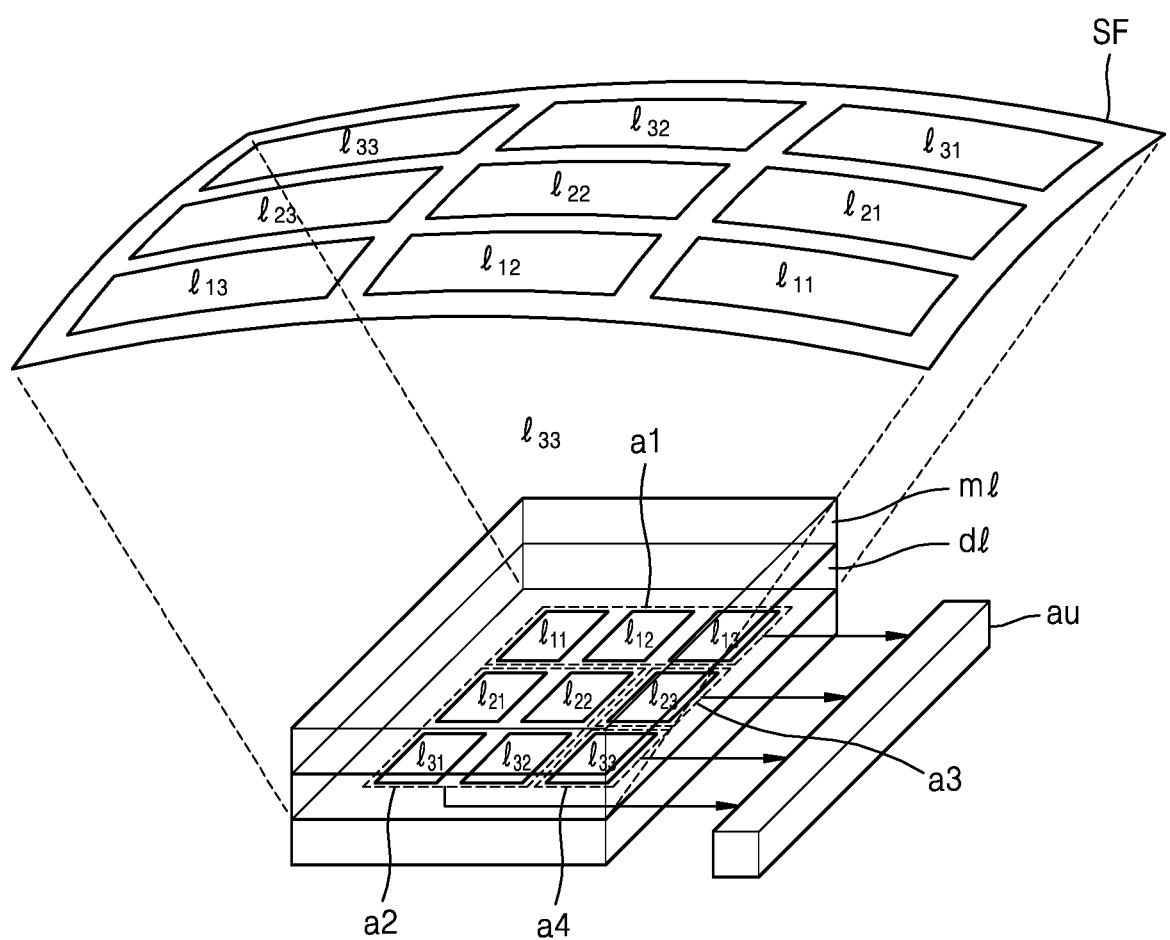
FIG. 11 is a schematic diagram illustrating a laser addressing operation of an addressing unit according to an example embodiment.

FIG. 11 is a diagram illustrating a laser addressing operation of an addressing unit au according to an example embodiment. Referring to FIG. 11, a plurality of laser sources l11, l12, l13, l21, l22, l23, l31, l32, and l33 irradiating light are arranged in a matrix, and the addressing unit au that independently addresses operation of each laser source is provided.

The plurality of laser sources l11, l12, l13, l21, l22, l23, l31, l32, and l33 may be arranged in an i×j matrix, wherein the index "i" is in a row direction and the index "j" is in a column direction. Referring to FIG. 11, the plurality of laser sources l11, l12, l13, l21, l22, l23, l31, l32, and l33 are arranged in a matrix (i=1, 2, 3, and j=1, 2, 3), but are not limited thereto. Hereinafter, operations of the addressing unit au will be described below based on a plurality of laser sources lij that are conventionally configured.

In some example embodiments, the addressing unit "au" may separately control the plurality of laser sources lij to be turned on/turned off in a certain order according to time. For example, the addressing unit "au" may drive the plurality of laser sources lij that are configured to be turned on/turned off, for example sequentially turned on/turned off. For example, the plurality of laser sources from j=1 to j=n may be turned on/turned off, for example sequentially turned on/turned off, and the plurality of laser sources from i=1 to i=m may be always turned on. Through the above operations, the structured light may be irradiated to scan the spatial frequency domain in a direction. Here, "m" denotes the total number of rows and "n" denotes the total number of columns. Otherwise, the addressing unit "au" may turn on/turn off, for example sequentially turn on/turn, off the plurality of laser sources that are arrayed in the row direction. For example, the plurality of laser sources from j=1 to j=n may be always turned on, and may be turned on/turned off, for example sequentially turned on/turned off, from i=1 to i=m. Through the above operations, the structured light may be irradiated to scan the spatial frequency domain in a direction. Here, "m" denotes the total number of rows and "n" denotes the total number of columns. For example, the addressing unit "au" may turn on/turn off in units of groups, wherein the group includes some of the plurality of laser sources lij. For example, 2×2 laser sources may be defined as one group, and then the laser sources may be turned on/turned off in units of groups. Through the above operations, the structured light may be irradiated to scan a desired spatial area in the spatial frequency domain. Otherwise, the addressing unit "au" may separately control the plurality of laser sources lij. Through the above operations, the structured light may be irradiated to scan an arbitrary spatial area in the spatial frequency domain.

Each of, or at least one of, the plurality of laser sources 111, 112, 113, 121, 122, 123, 131, 132, and 133 may form a corresponding structured light pattern on the spatial frequency domain SF in one-to-one correspondence. Since the light irradiated from each of, or at least one of, the laser sources 111, 112, 113, 121, 122, 123, 131, 132, and 133 is transmitted through the effective zone "ez" of the meta-pattern layer "ml" and the proceeding direction thereof is changed in the deflecting layer "dl," a location on the spatial frequency domain SF of the structured light corresponding to each of, or at least one of, the laser sources may be changed. For example, as shown in FIG. 11, the configuration of the structured light formed on the spatial frequency domain SF by the light irradiated from the plurality of laser sources 111, 112, 113, 121, 122, 123, 131, 132, and 133 may be reversed 180° degrees from the configuration of the plurality of laser sources. However, the example embodiments are not limited to the above example.

When the addressing unit au only controls some of the plurality of laser sources 111, 112, 113, 121, 122, 123, 131, 132, and 133, the structured light may be formed only on the spatial frequency domain SF corresponding to the controlled laser source. Since the nanostructured optical element according to the example embodiment further includes the addressing unit au, the scanning operation may be performed in a certain type and a temporal order on the spatial frequency domain SF. For example, the scanning operation of an appropriate manner may be performed according to the shape of the object and the application of the depth sensing.

Figure 12:
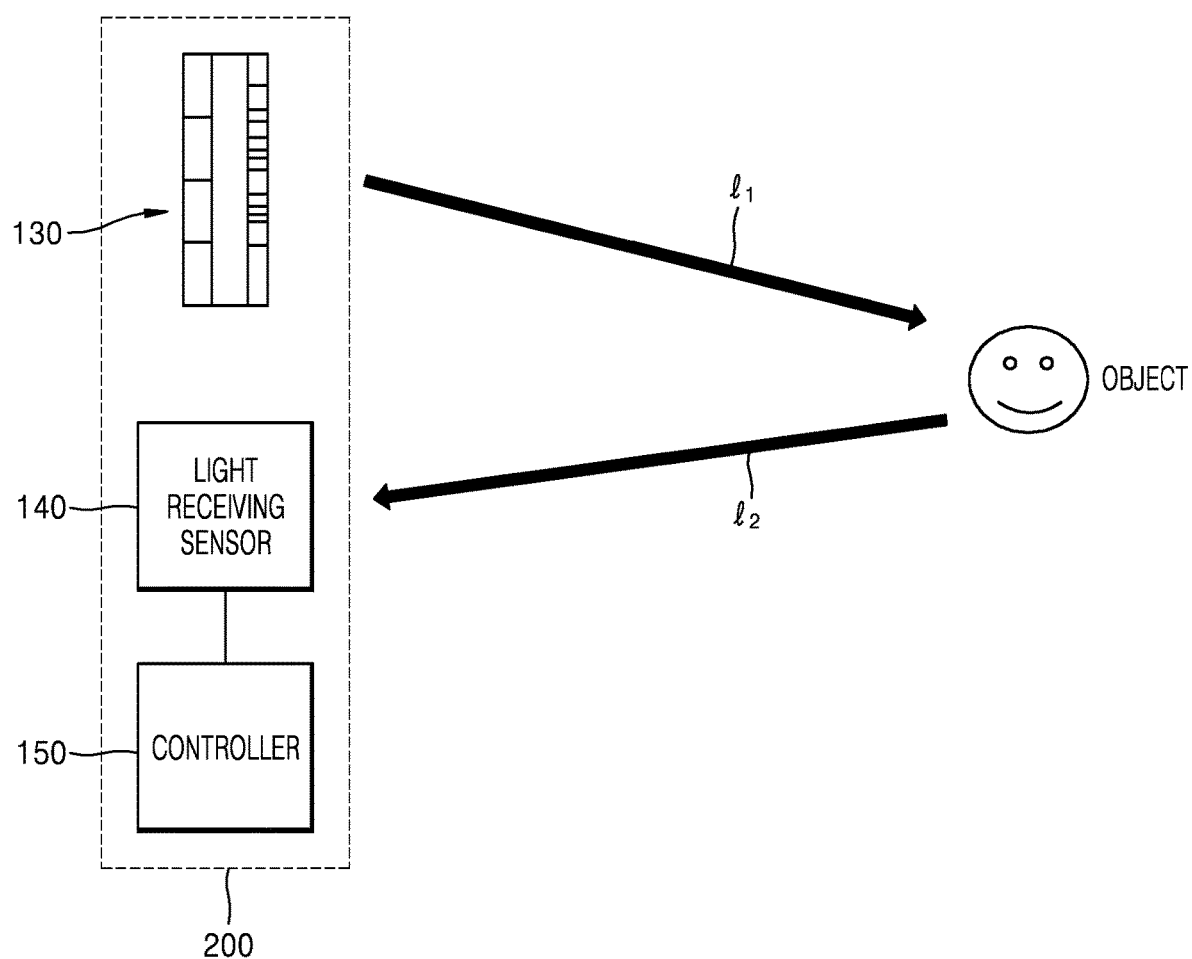
FIG. 12 is a schematic diagram of a depth sensor according to an example embodiment.

FIG. 12 is a schematic diagram of a depth sensor 200 according to an example embodiment. The depth sensor 200 may include a nanostructured optical element 130 irradiating structured light l1 onto an object, a light-receiving sensor 140 receiving structured light l2 reflected by the object, and a controller 150 obtaining distance information by analyzing structured light received by the light-receiving sensor 140.

Optical elements for performing additional functions, e.g., controlling the direction of the light towards the object, controlling a size of a beam, etc., may be additionally arranged between the nanostructured optical element 130 and the object.

The light-receiving sensor 140 senses the structured light reflected by the object. The light-receiving sensor 140 may include an array of photodetecting elements. The light-receiving sensor 140 may further include a dispersing optical element for analyzing the structured light reflected by the object in units of wavelengths.

The controller 150 may analyze the light received by the light-receiving sensor 140 to determine the depth information based on a distortion degree of the structured light. Also, the controller 150 may control operations of the nanostructured optical element 130 and the light-receiving sensor 140. For example, the controller 150 may further include a memory unit storing an operating program for extracting three-dimensional information for analyzing the depth information.

Figure 13:
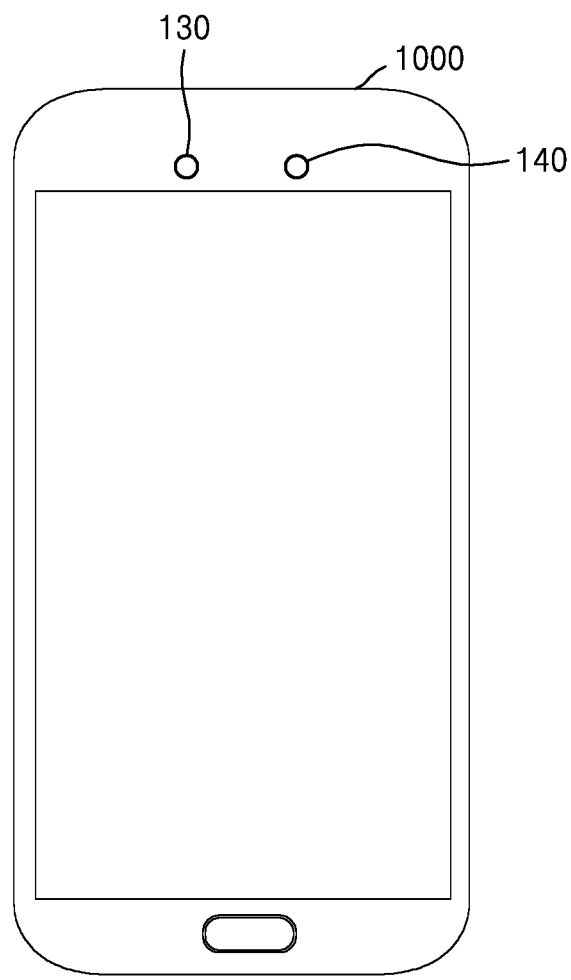
FIG. 13 is a diagram of an electronic device including a depth sensor according to an example embodiment.

FIG. 13 is a diagram of an electronic device 1000 including a depth sensor according to an example embodiment.

Referring to FIG. 13, the electronic device 1000 may include the nanostructured optical element 130 irradiating structured light and the light-receiving sensor 140 sensing the structured light.

A depth sensor 1100 may be used in any of various electronic devices 1000 since the depth sensor 1100 may accurately obtain three-dimensional information about an object. For example, the electronic device 1000 may be a smartphone, but is not limited thereto. The electronic device 1000 may be a mobile communication device such as a smartphone, an Internet of things (IoT) device, or an augmented reality device. Alternately, the electronic device 1000 may be an autonomous driving device such as an unmanned vehicle, an autonomous driving vehicle, a robot, a drone, etc.

Figure 14A:
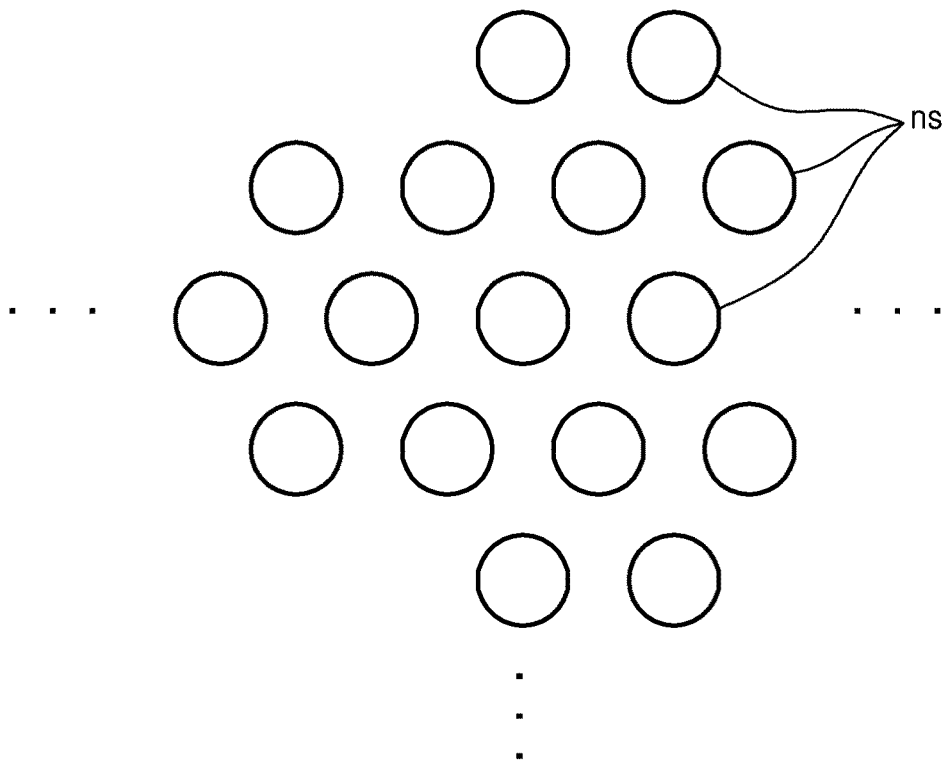
FIGS. 14A and 14B are schematic diagrams showing arrangements of nano-posts according to an example embodiment.
Figure 14B:
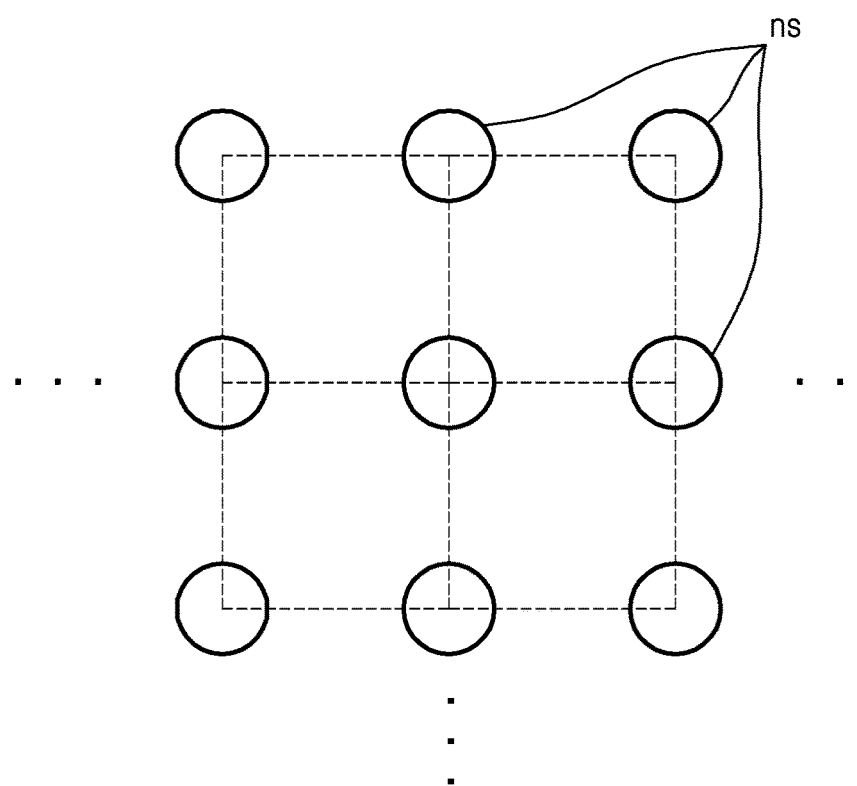

FIGS. 14A and 14B are schematic diagrams showing arrangements of nano-posts according to example embodiments.

Referring to FIG. 14A, the plurality of first nano-posts ns may be arranged in a hexagonal lattice. The above arrangement may have an excellent optical characteristic modulation property.

Referring to FIG. 14B, the plurality of first nano-posts ns may be arranged in a rectangular lattice. The above arrangement may be easily manufactured.

Figure 15:
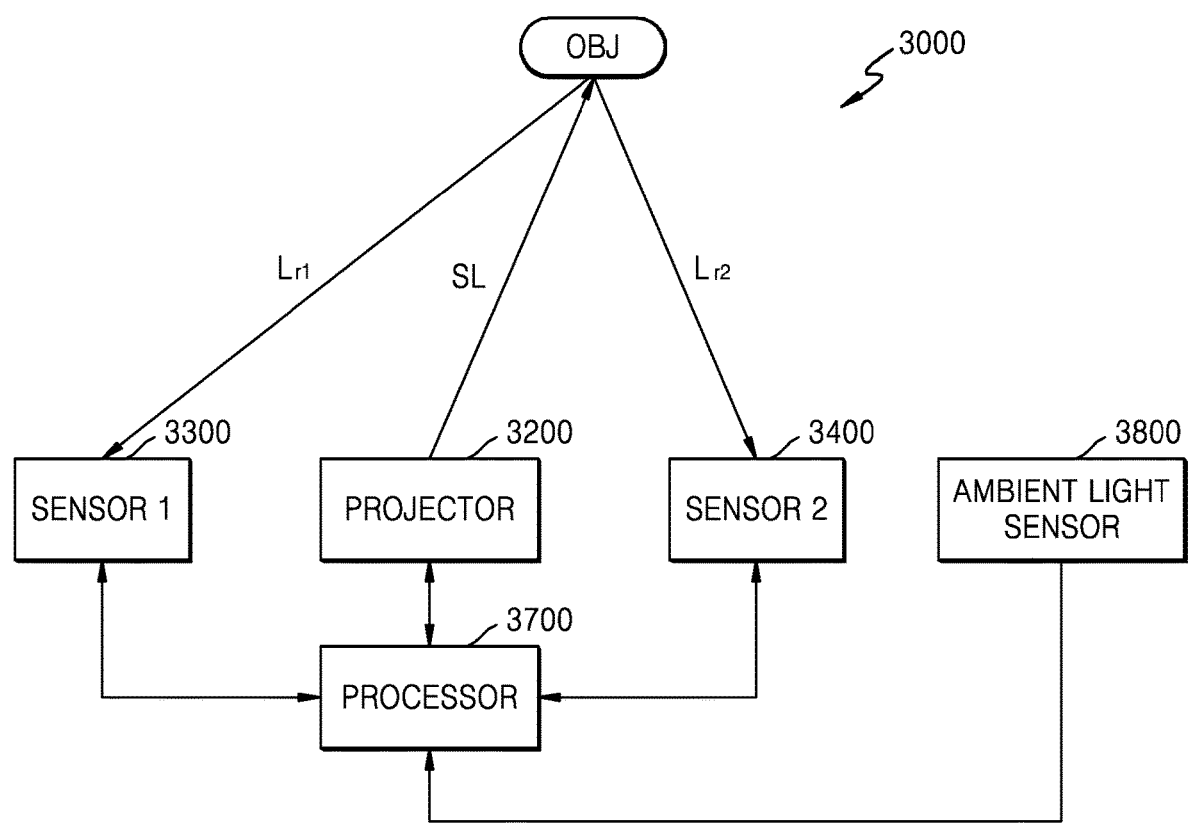
FIG. 15 is a block diagram illustrating a schematic configuration of a depth recognition apparatus according to some example embodiments.

FIG. 15 is a block diagram illustrating a schematic configuration of a depth recognition apparatus 3000 according to some example embodiments;

The depth recognition apparatus 3000 includes a projector 3200 configured to emit structured light SL toward an object OBJ, first and second sensors 3300 and 3400 placed at different positions from the projector 3200 and configured to sense light coming from the object OBJ, and a processor 3700 configured to calculate a depth position of the object OBJ by analyzing light received by at least one of the first and second sensors 3300 and 3400.

The projector 3200 may convert light emitted from an edge emitting device into structured light having a predetermined pattern and may output the structured light. The projector 3200 may include any one of the projectors 100, 101, and 102 of the above-described example embodiments or a combination thereof.

Each of the first and second sensors 3300 and 3400 may include an array of light detecting elements. The first and second sensors 3300 and 3400 are placed at different positions relative to the projector 3200, and thus when the first and second sensors 3300 and 3400 sense light coming from the object OBJ, image information of different positions is obtained. In some example embodiments, thus, accuracy may be improved as compared to the above-described embodiments in which only one sensor is used, and information about the depth of the object OBJ may be obtained by any of various methods according to usage environments. For example, the processor 3700 may analyze structured light SL which is emitted from the projector 3200 and reflected from the object OBJ. Alternatively, when the illuminance of ambient light is proper, the projector 3200 may be omitted, and the processor 3700 may analyze ambient light reflected from the object OBJ.

In addition, the depth recognition apparatus 3000 may further include an ambient light sensor 3800. The ambient light sensor 3800 may sense the intensity of ambient light, and when the magnitude of a signal sensed by the ambient light sensor 3800, for example, the intensity of infrared rays included in the ambient light, is equal to or greater than a given value, the processor 3700 may turn off the projector 3200 and analyze ambient light reflected from the object OBJ to calculate information about the depth of the object OBJ. Various modes in which the processor 3700 operates to obtain depth information will be described later with reference to FIGS. 18 to 24.

The first sensor 3300, the projector 3200, and the second sensor 3400 may be arranged in a line at given intervals. In FIG. 16, the projector 3200 is placed between the first and second sensors 3300 and 3400. However, this is a non-limiting example.

Figure 16A:
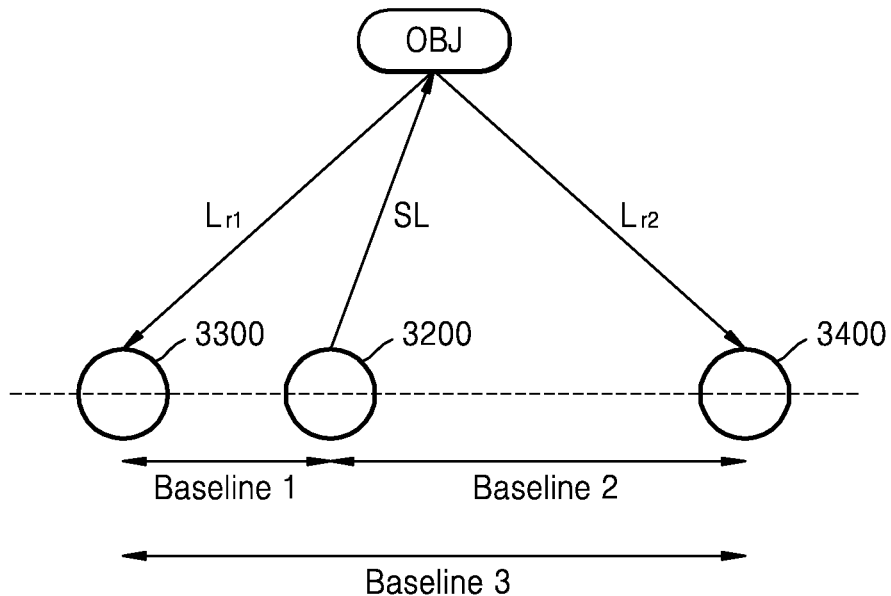
FIGS. 16A to 16C are views illustrating example arrangements of a plurality of sensors and a projector in the depth recognition apparatus shown in FIG. 15.
Figure 16B:
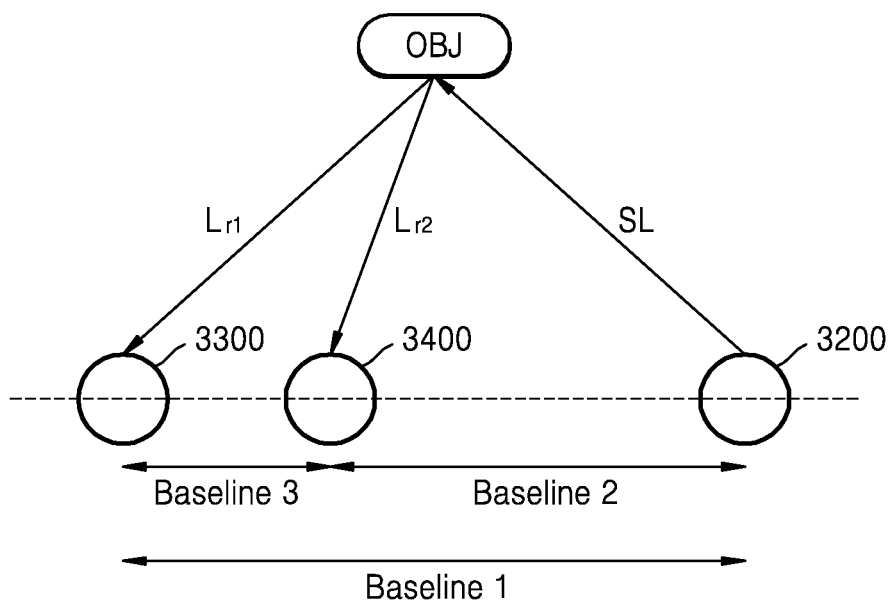
Figure 16C:
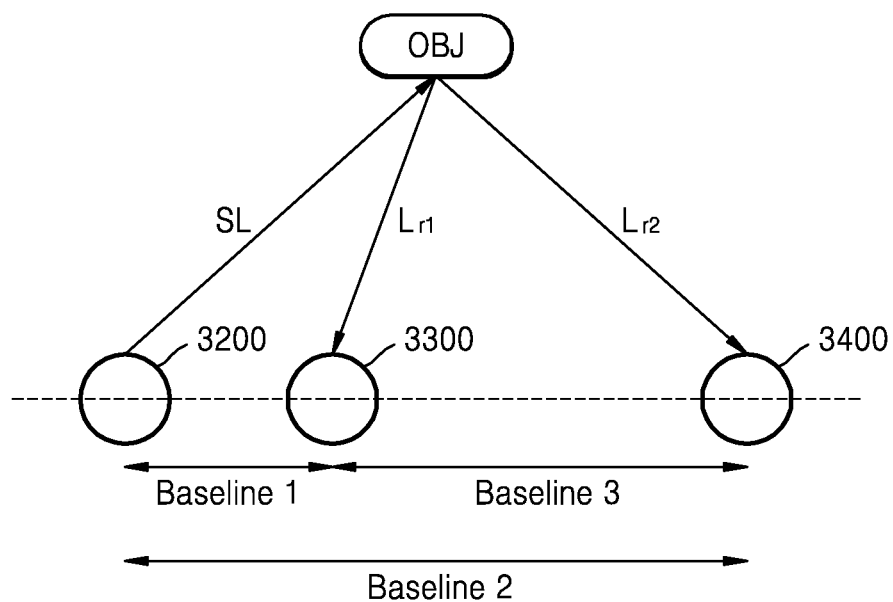

FIGS. 16A to 16C are views illustrating example arrangements of the first and second sensors 3300 and 3400 and the projector 3200 in the depth recognition apparatus 3000 shown in FIG. 16.

When the distance between the first sensor 3300 and the projector 3200, the distance between the second sensor 3400 and the projector 3200, and the distance between the first and second sensors 3300 and 3400 are indicated by baseline 1, baseline 2, and baseline 3, respectively, there may be various combinations with baselines 1, 2, and 3 having any of various values.

Referring to FIG. 16A, the projector 3200 and the first and second sensors 3300 and 3400 may be arranged such that the projector 3200 may be placed between the first and second sensors 3300 and 3400 in a condition of baseline 1<baseline 2<baseline 3.

Referring to FIG. 16B, the projector 3200 and the first and second sensors 3300 and 3400 may be arranged such that the second sensor 3400 may be placed between the projector 3200 and the first sensor 3300 in a condition of baseline 3<baseline 2<baseline 1.

Referring to FIG. 16C, the projector 3200 and the first and second sensors 3300 and 3400 may be arranged such that the first sensor 3300 may be placed between the projector 3200 and the second sensor 3400 in a condition of baseline 1<baseline 3<baseline 2.

Figure 17:
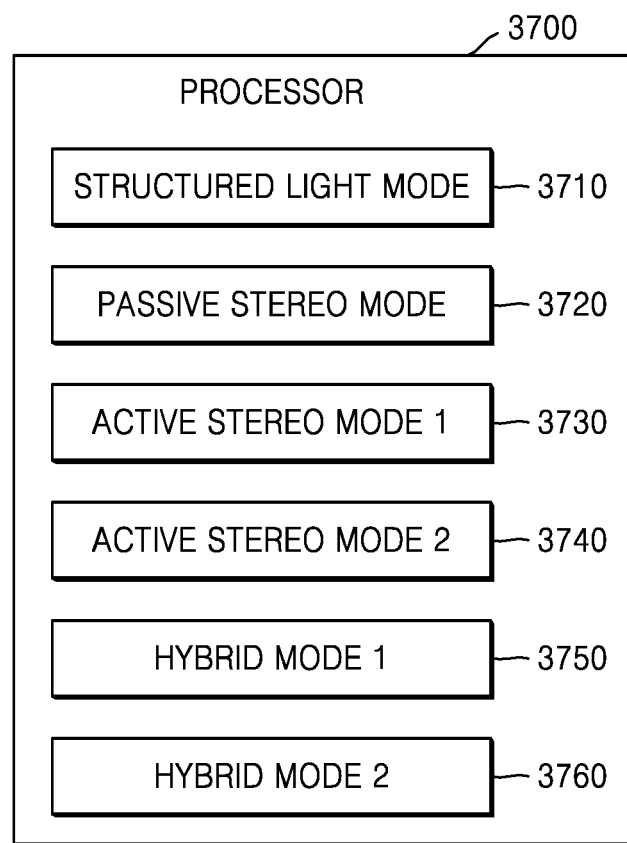
FIG. 17 is a view illustrating modes in which a processor of the depth recognition apparatus shown in FIG. 15 operates.

FIG. 17 is a view illustrating modes in which the processor 3700 of the depth recognition apparatus 3000 shown in FIG. 15 operates. FIGS. 18 to 23 are block diagrams illustrating operations and processing in the example execution modes shown in FIG. 17.

The processor 3700 may operate selectively in one of a structured light mode 3710, a passive stereo mode 3720, a first active stereo mode 3730, a second active stereo mode 3740, a first hybrid mode 3750, and a second hybrid mode 3760.

A program for operations in the different modes may be stored in a memory, and the processor 3700 may execute the program.

The processor 3700 may select one of the modes and operate in the selected mode according to a user's input or a control signal from another execution module.

Figure 18:
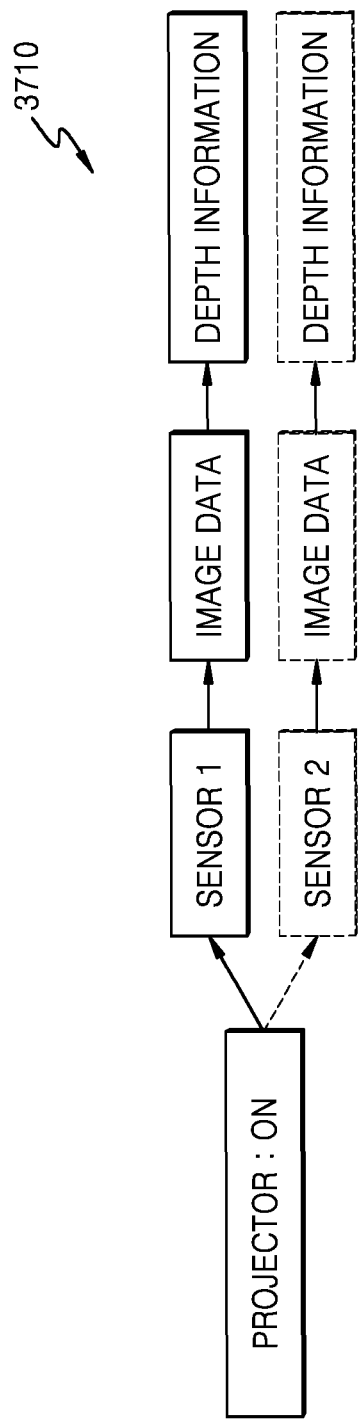
FIGS. 18 to 23 are block diagrams illustrating operations and processing in the example execution modes shown in FIG. 17.

Referring to FIG. 18, in the structured light mode 3710, a projector is controlled to be turned on. That is, the projector emits structured light toward an object, and one of first and second sensors receives light reflected from the object. Image data obtained using the one of the first and second sensors may be compared with the pattern of the structured light emitted by the projector and may be analyzed to obtain depth information about the object. The one of the first and second sensors to be used for depth information analysis may be determined according to usage environments. For example, the one of the first and second sensors resulting in a clearer image may be selected according to the position of the object.

Figure 19:
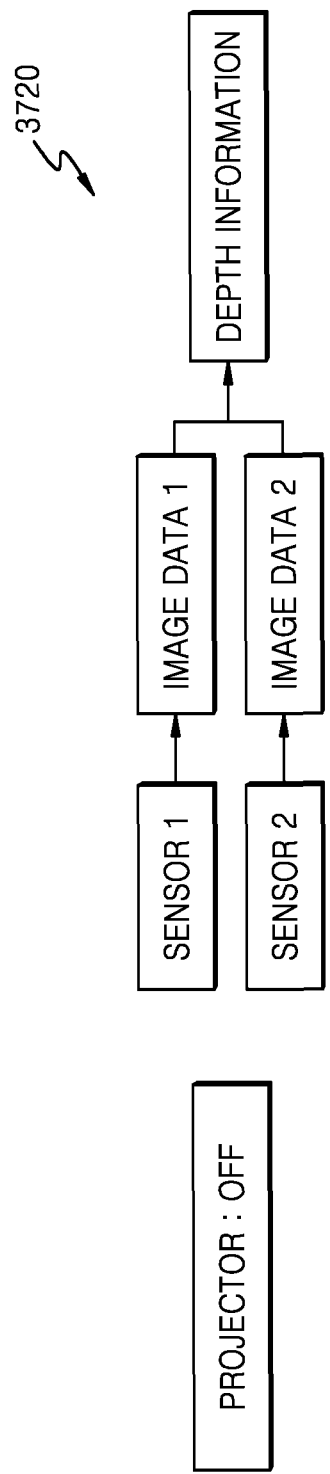

Referring to FIG. 19, in the passive stereo mode 3720, the projector is controlled to be turned off. That is, the projector does not emit structured light toward the object. This mode may be used when the intensity of ambient light is sufficient. Image data 1 about the object may be obtained from a signal that the first sensor outputs when receiving ambient light reflected from the object, image data 2 about the object may be obtained from a signal that the second sensor outputs when receiving ambient light reflected from the object, and depth information about the object may be obtained from the image data 1 and the image data 2.

Figure 20:
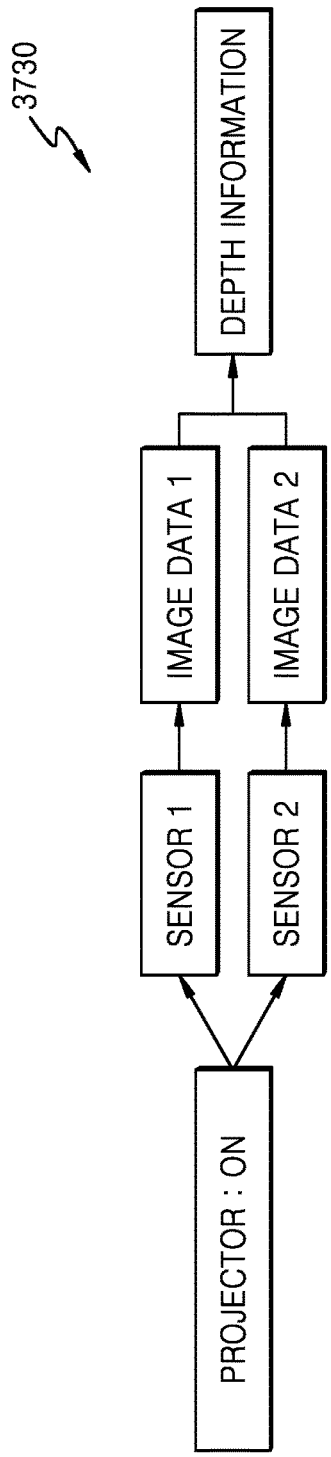

Referring to FIG. 20, in the first active stereo mode 3730, the projector is controlled to be turned on. That is, the projector emits structured light toward the object, and both the first and second sensors receive light reflected from the object. Image data 1 obtained using the first sensor and image data 2 obtained using the second sensor are image data from different view points and may be analyzed to obtain depth information about the object.

Figure 21:
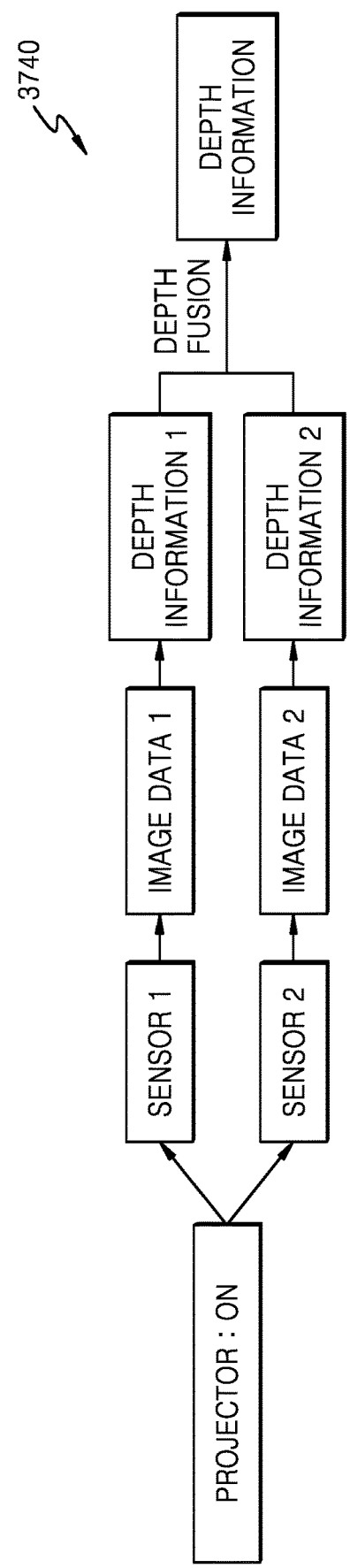

Referring to FIG. 21, in the second active stereo mode 3740, the projector is controlled to be turned on. That is, the projector emits structured light toward the object, and both the first and second sensors receive light reflected from the object. Image data 1 is obtained from the first sensor that receives structured light emitted by the projector and reflected from the object, and depth information 1 may be obtained from the image data 1. In the same manner, depth information 2 may be obtained from image data 2 of the second sensor. The depth information 1 and the depth information 2 may be combined to obtain final depth information, and the final depth information may be more accurate than the depth information obtained using only one of the first and second sensors in the structured light mode 3710 described with reference to FIG. 18.

Figure 22:
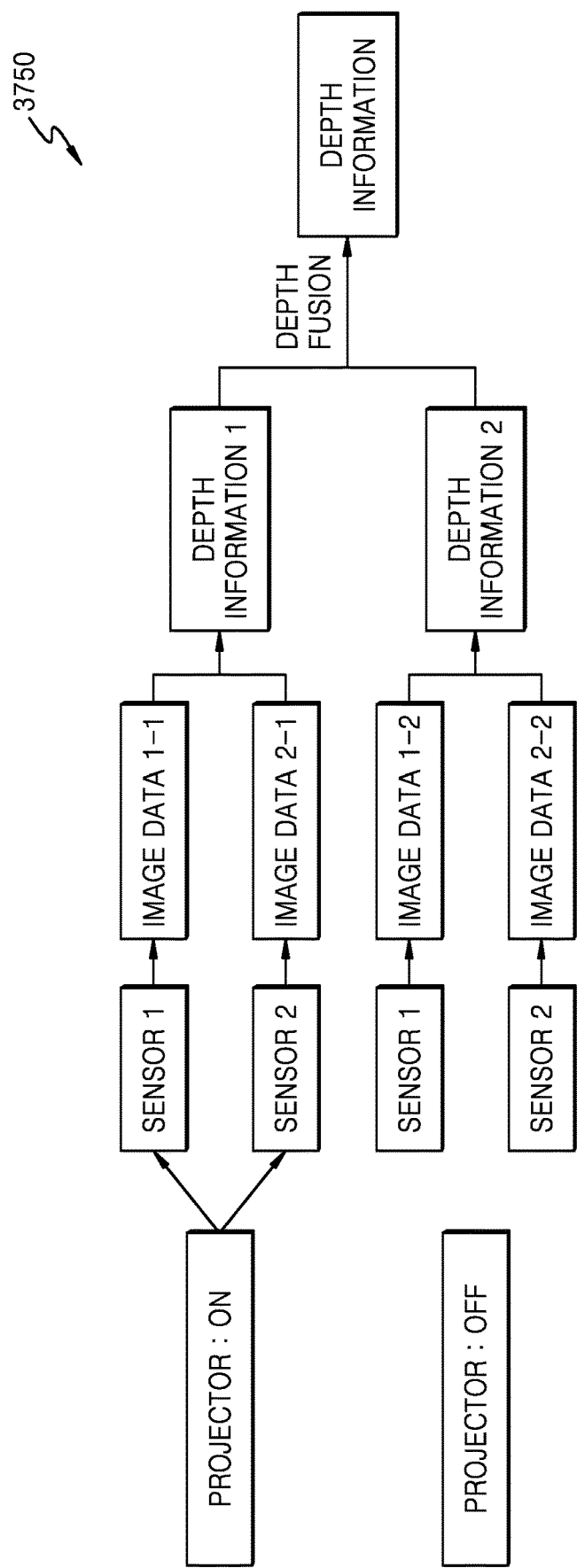

Referring to FIG. 22, in the first hybrid mode 3750, the projector is controlled to be alternately turned on and off to obtain depth information 1 and depth information 2 in the respective states, and the depth information 1 and the depth information 2 are combined to obtain final depth information.

The projector is controlled to be turned on, and image data 1-1 and image data 2-1 are respectively obtained from light received at the first sensor and light received at the second sensor. The depth information 1 about the object is calculated from the image data 1-1 and the image data 2-1. The depth information 1 may be obtained in the same manner as the depth information is obtained in the first active stereo mode 3730 described with reference to FIG. 20. However, the depth information 1 is not limited thereto. For example, the depth information 1 may be obtained in the same manner as the depth information is obtained in the second active stereo mode 3740 described with reference to FIG. 21.

In addition, the projector is controlled to be turned off, and image data 1-2 and image data 2-2 are respectively obtained from light received at the first sensor and light received at the second sensor. The depth information 2 about the object is calculated from the image data 1-2 and the image data 2-2. The depth information 2 may be obtained in the same manner as the depth information is obtained in the passive stereo mode 3720 described with reference to FIG. 19.

Next, the depth information 1 and the depth information 2 are combined to obtain the final depth information.

Figure 23:
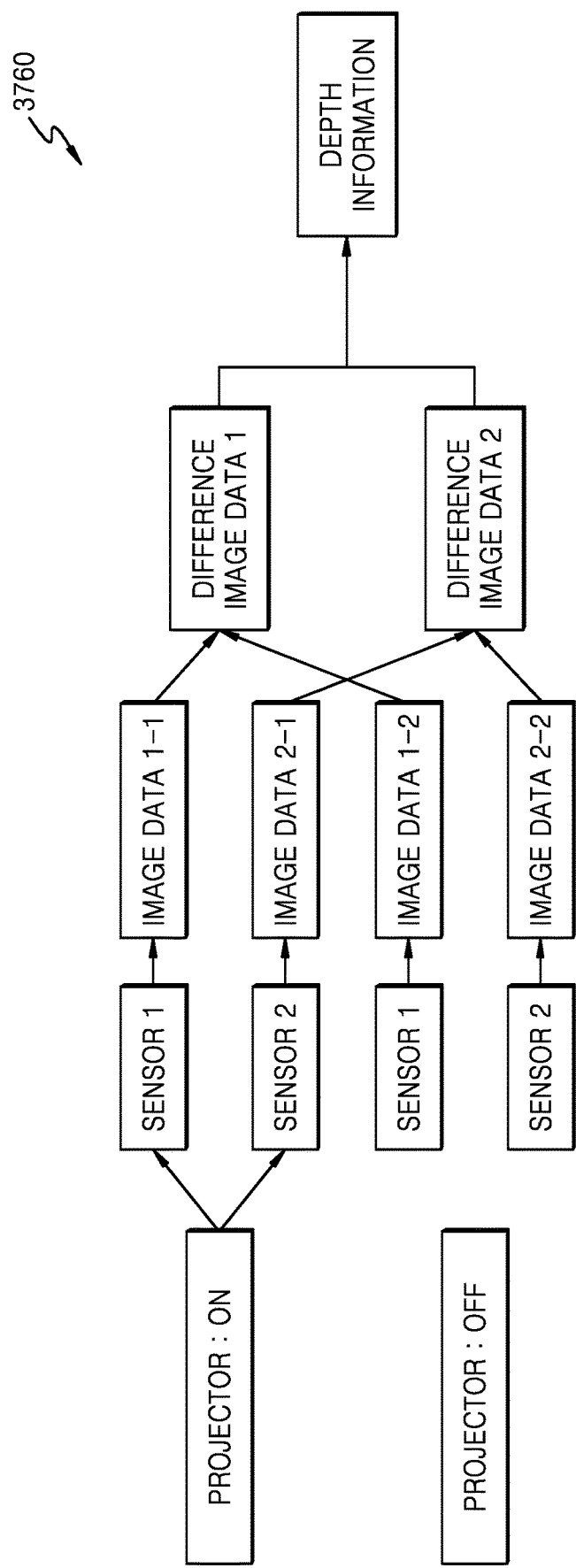

Referring to FIG. 23, in the second hybrid mode 3760, the projector is controlled to be alternately turned on and off to obtain difference image data 1 and difference image data 2 in the respective states, and the difference image data 1 and the difference image data 2 are combined to obtain final depth information.

The projector is controlled to be turned on, and image data 1-1 and image data 2-1 are respectively obtained from light received at the first sensor and light received at the second sensor. In addition, the projector is controlled to be turned off, and image data 1-2 and image data 2-2 are respectively obtained from light received at the first sensor and light received at the second sensor.

The difference image data 1 is calculated from the difference between the image data 1-1 and the image data 1-2, and the difference image data 2 is calculated from the difference between the image data 2-1 and the image data 2-2.

To obtain the difference image data 1, for example, a matrix formed of image data 1-2, {image data 1-2}, that is obtained using the first sensor when the projector is turned off may be subtracted from the matrix formed of image data 1-1, {image data 1-1}, that is obtained using the first sensor when the projector is turned on. In other words, the difference image data 1 is obtained using the first sensor from light which is reflected from the object and involves only structured light without the influence of ambient light.

In the same manner, to obtain the difference image data 2, a matrix formed of image data 2-2, {image data 2-2}, that is obtained using the second sensor when the projector is turned off may be subtracted from the matrix formed of image data 2-1, {image data 2-1} that is obtained using the second sensor when the projector is turned on. In other words, the difference image data 2 is obtained using the second sensor from light which is reflected from the object and involves only structured light without the influence of ambient light.

The difference image data 1 and the difference image data 2 are data obtained using the first and second sensors placed at different view points, and may be used to calculate depth information about the object.

Figure 24:
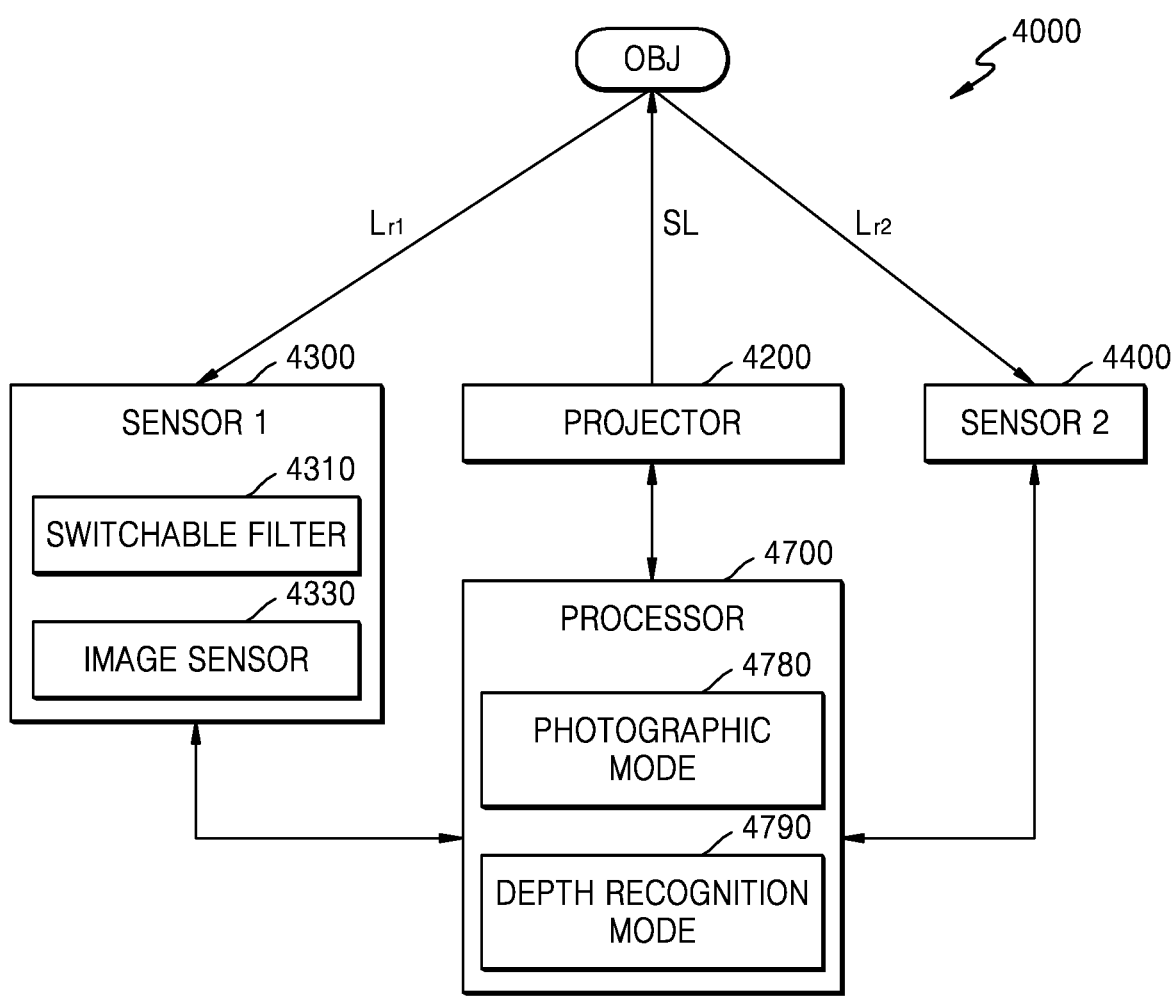
FIG. 24 is a block diagram illustrating a schematic configuration of a depth recognition apparatus according to some example embodiments.

FIG. 24 is a block diagram illustrating a schematic configuration of a depth recognition apparatus 4000 according to some example embodiments.

The depth recognition apparatus 4000 includes a projector 4200, a first sensor 4300, a second sensor 4400, and a processor 4700.

The projector 4200 may convert light emitted from an edge emitting device into structured light having a predetermined pattern and may output the structured light. The projector 3200 may include any one of the projectors 100, 101, and 102 of the above-described example embodiments or a combination thereof.

The first sensor 4300 and the second sensor 4400 may be placed at different positions relative to the projector 4200, and the processor 4700 may obtain depth information about an object OBJ from light coming from the object OBJ and sensed by at least one of the first and second sensors 4300 and 4400.

The depth recognition apparatus 4000 has a configuration in which sensors for depth recognition may also be used for normal photographing. As illustrated in FIG. 25, the first sensor 4300 includes a switchable filter 4310 that may be operated in an infrared cut-off mode or an infrared transmission mode, and an image sensor 4330 configured to sense light transmitted through the switchable filter 4310. However, this is a non-limiting configuration. Alternatively, the second sensor 4400 may include a switchable filter and an image sensor.

The processor 4700 controls the first sensor 4300 according to a normal photographic mode 4780 or a depth recognition mode 4790. In the normal photographic mode 4780, the switchable filter 4310 is controlled to block infrared rays, and thus an object image may be obtained from visible light reflected from the object OBJ and sensed by the image sensor 4330. In the depth recognition mode 4790, the switchable filter 4310 may be controlled to transmit infrared rays. Infrared image data for obtaining depth information is obtained from infrared rays reflected from the object OBJ and sensed by the image sensor 4330. In the depth recognition mode 4790, both the first sensor 4300 and the second sensor 4400 may be used, and the depth recognition mode 4790 may include the above-described various modes in which the processor 3700 of the depth recognition apparatus 3000 operates.

It should be understood that example embodiments described herein should be considered in a descriptive sense only and not for purposes of limitation. Descriptions of features within each example embodiment should typically be considered as available for other similar features in other example embodiments.

While one or more example embodiments have been described with reference to the figures, it will be understood by those of ordinary skill in the art that various changes in form and details may be made therein without departing from the spirit and scope as defined by the following claims.

What is claimed is:

1. A depth recognition apparatus comprising:
   a projector;
   a first sensor, disposed in a first position with respect to the projector, and configured to receive light from an object;
   a second sensor, disposed in a second position with respect to the projector, different from the first position, and configured to receive light from the object; and
   a processor configured to analyze the light received by at least one of the first and second sensors and thereby calculate a depth position of the object,
   wherein the projector comprises:
      a light source comprising an array of a plurality of laser sources outputting light;
      a meta-pattern layer comprising a two-dimensional array of a plurality of first nano-posts, wherein each of the plurality of first nano-posts has a dimension smaller than a wavelength of light output by the plurality of laser sources, and wherein the meta-pattern layer is configured to convert light incident thereon into structured light; and
      a deflecting layer between the light source and the meta-pattern layer, the deflecting layer configured to direct light from the light source onto the meta-pattern layer,
   wherein the processor is further configured to:
      obtain first depth information about the object by analyzing the structured light emitted from the projector onto the object and the light received by the first sensor;
      obtain second depth information about the object by analyzing the structured light emitted from the projector onto the object and the light received by the second sensor; and
      calculate the depth position of the object based on the first depth information and the second depth information.

2. The depth recognition apparatus of claim 1, wherein the processor is further configured to:
   obtain first image data from light received by the first sensor;
   obtain second image data from light received by the second sensor; and
   calculate the depth position of the object based on the first image data and the second image data.

3. The depth recognition apparatus of claim 1, wherein the deflecting layer comprises one of a convex lens and a Fresnel lens.

4. The depth recognition apparatus of claim 1, wherein the deflecting layer comprises a two-dimensional array of a plurality of second nano-posts, wherein each of the plurality of second nano-posts has a dimension smaller than the wavelength of light output by the plurality of laser sources.

5. The depth recognition apparatus of claim 4, further comprising:
a supporting layer between the meta-pattern layer and the deflecting layer,
wherein the meta-pattern layer is disposed on a first surface of the supporting layer, and the deflecting layer is disposed on a second surface of the supporting layer, opposite the first surface.

6. The depth recognition apparatus of claim 1, wherein the meta-pattern layer further comprises a supporting layer supporting the plurality of first nano-posts, and the meta-pattern layer has a refractive index that is at least one greater than a refractive index of the supporting layer.

7. The depth recognition apparatus of claim 1, wherein the array of the plurality of first nano-posts comprises one of a hexagonal lattice and a rectangular lattice.

8. The depth recognition apparatus of claim 1, wherein a shape of at least a first one of the plurality of first nano-posts is different from a shape of at least a second one of the plurality of first nano-posts.

9. The depth recognition apparatus of claim 1, wherein at least one of a width and a height of at least a first one of the plurality of first nano-posts is different from at least one of a width and a height of a second one of the plurality of first nano-posts.

10. The depth recognition apparatus of claim 1, wherein each of the plurality of first nano-posts has a multi-layered structure.

11. The depth recognition apparatus of claim 1, wherein the plurality of first nano-posts are configured such that the structured light output from the meta-pattern layer does not overlap in a spatial frequency domain.

12. The depth recognition apparatus of claim 1, wherein the plurality of first nano-posts are configured such that the structured light output from the meta-pattern layer overlaps in a spatial frequency domain.

13. A depth recognition apparatus comprising:
a projector;
a first sensor, disposed in a first position with respect to the projector, and configured to receive light from an object;
a second sensor, disposed in a second position with respect to the projector, different from the first position, and configured to receive light from the object;
an ambient light sensor configured to sense illuminance in an area surrounding the object; and
a processor configured to analyze the light received by at least one of the first and second sensors and thereby calculate a depth position of the object,
wherein the projector comprises:
a light source comprising an array of a plurality of laser sources outputting light;
a meta-pattern layer comprising a two-dimensional array of a plurality of first nano-posts, wherein each of the plurality of first nano-posts has a dimension smaller than a wavelength of light output by the plurality of laser sources, and wherein the meta-pattern layer is configured to convert light incident thereon into structured light; and
a deflecting layer between the light source and the meta-pattern layer, the deflecting layer configured to direct light from the light source onto the meta-pattern layer, and
wherein the processor is further configured to turn off the projector based on a signal sensed by the ambient light sensor being equal to or greater than a given value.

14. The depth recognition apparatus of claim 13, wherein when the projector is in an off-state, the processor is further configured to:
obtain first image data about the object from a signal output from the first sensor based on ambient light reflected from the object and received by the first sensor;
obtain second image data about the object from a signal output from the second sensor based on ambient light reflected from the object and received by the second sensor; and
calculate the depth position of the object based on the first image data and the second image data.

15. A depth recognition apparatus comprising:
a projector;
a first sensor, disposed in a first position with respect to the projector, and configured to receive light from an object;
a second sensor, disposed in a second position with respect to the projector, different from the first position, and configured to receive light from the object; and
a processor configured to analyze the light received by at least one of the first and second sensors and thereby calculate a depth position of the object,
wherein the projector comprises:
a light source comprising an array of a plurality of laser sources outputting light;
a meta-pattern layer comprising a two-dimensional array of a plurality of first nano-posts, wherein each of the plurality of first nano-posts has a dimension smaller than a wavelength of light output by the plurality of laser sources, and wherein the meta-pattern layer is configured to convert light incident thereon into structured light; and
a deflecting layer between the light source and the meta-pattern layer, the deflecting layer configured to direct light from the light source onto the meta-pattern layer, and
wherein the processor is further configured to:
when the projector is on, obtain primary-first image data and secondary-first image data based on light received by the first sensor and the second sensor, respectively; and
when the projector is off, obtain primary-second image data and secondary-second image data from light received by the first sensor and the second sensor, respectively.

16. The depth recognition apparatus of claim 15, wherein the processor is further configured to:
calculate first depth information about the object based on the primary-first image data and the secondary-first image data;
calculate second depth information about the object based on the primary-second image data and the secondary-second image data; and
calculate the depth position of the object based on the first depth information and the second depth information.

17. The depth recognition apparatus of claim 15, wherein the processor is further configured to:

calculate first difference image data based on a difference between the primary-first image data and the primary-second image data;
calculate second difference image data based on a difference between the secondary-first image data and the secondary-second image data; and
calculate the depth position of the object based on the first difference image data and the second difference image data.

18. A depth recognition apparatus comprising:
a projector;
a first sensor, disposed in a first position with respect to the projector, and configured to receive light from an object;
a second sensor, disposed in a second position with respect to the projector, different from the first position, and configured to receive light from the object; and
a processor configured to analyze the light received by at least one of the first and second sensors and thereby calculate a depth position of the object,
wherein the projector comprises:
  a light source comprising an array of a plurality of laser sources outputting light;
  a meta-pattern layer comprising a two-dimensional array of a plurality of first nano-posts, wherein each of the plurality of first nano-posts has a dimension smaller than a wavelength of light output by the plurality of laser sources, and wherein the meta-pattern layer is configured to convert light incident thereon into structured light; and
  a deflecting layer between the light source and the meta-pattern layer, the deflecting layer configured to direct light from the light source onto the meta-pattern layer,
wherein at least one of the first sensor and the second sensor comprises:
  a switchable filter configured to be switched between an infrared-cut mode, in which infrared light is blocked, and an infrared transmission mode, in which infrared light is transmitted therethrough; and
  an image sensor configured to sense light transmitted through the switchable filter.

19. The depth recognition apparatus of claim 18, wherein the processor is further configured to control the switchable filter to block infrared light in a normal photographic mode and to transmit infrared light in a depth recognition mode.

* * * * *